US012811192B2

(12) United States Patent
Kwon et al.

(10) Patent No.: US 12,811,192 B2
(45) Date of Patent: Nov. 24, 2026

(54) SOLID-STATE ELECTROLYTE, LITHIUM BATTERY COMPRISING SOLID-STATE ELECTROLYTE, AND PREPARATION METHOD OF SOLID-STATE ELECTROLYTE

(71) Applicant: Samsung Electronics Co., Ltd., Suwon-si (KR)

(72) Inventors: Giyun Kwon, Suwon-si (KR); Sangbok Ma, Suwon-si (KR); Hyeokjo Gwon, Suwon-si (KR); Youngjoon Bae, Suwon-si (KR); Gabin Yoon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 552 days.

(21) Appl. No.: 18/472,386

(22) Filed: Sep. 22, 2023

(65) Prior Publication Data

US 2024/0113327 A1 Apr. 4, 2024

(30) Foreign Application Priority Data

Sep. 23, 2022 (KR) ........................ 10-2022-0121146
Sep. 12, 2023 (KR) ........................ 10-2023-0121343

(51) Int. Cl.

*H01M 10/0562* (2010.01)
*C01F 7/78* (2022.01)
*H01M 10/052* (2010.01)
*H01M 10/0525* (2010.01)

(52) U.S. Cl.

CPC ........... *H01M 10/0562* (2013.01); *C01F 7/78* (2022.01); *H01M 10/052* (2013.01); *H01M 10/0525* (2013.01); *C01P 2002/72* (2013.01); *C01P 2002/74* (2013.01); *C01P 2006/40* (2013.01); *H01M 2300/0071* (2013.01); *H01M 2300/008* (2013.01)

(58) Field of Classification Search

None
See application file for complete search history.

(56) References Cited

U.S. PATENT DOCUMENTS 7,419,746 B2 9/2008 Ugaji et al.
7,914,932 B2 3/2011 Yoshida et al.
2021/0167356 A1 6/2021 Ma et al.
2022/0158225 A1 5/2022 Choi et al.

(Continued)

FOREIGN PATENT DOCUMENTS

CN 116666739 A * 8/2023 ........ H01M 10/0562
JP H04-60303 B2 9/1992

(Continued)

OTHER PUBLICATIONS

Sun et al, CN 116666739 A, English Translation from FIT, 9 pages (Year: 2023).*

(Continued)

*Primary Examiner* — Colin W. Slifka
(74) *Attorney, Agent, or Firm* — CANTOR COLBURN LLP

(57) ABSTRACT

A solid-state electrolyte including:
a compound represented by Formula 1

$$Li_{5-4y}Al_{1-y}X_yO_{4-4y-\delta} \qquad \text{Formula 1}$$

wherein in Formula 1, $0.1 \geq y \geq 0.8$ and $0 \leq \delta < 1$, and X is Cl, Br, or a combination thereof, and
wherein the compound is amorphous.

20 Claims, 12 Drawing Sheets

(56) References Cited

U.S. PATENT DOCUMENTS

| | | | | |
|---|---|---|---|---|
| 2023/0021952 | A1* | 1/2023 | Hayashi | C01F 7/56 |
| 2024/0154159 | A1 | 5/2024 | Ma et al. | |

FOREIGN PATENT DOCUMENTS

| | | | |
|---|---|---|---|
| JP | 3677509 | B2 | 5/2005 |
| JP | 2006120437 | A | 5/2006 |
| JP | 2007258165 | A | 10/2007 |
| KR | 20210068964 | A | 6/2021 |
| KR | 20210150718 | A | 12/2021 |
| KR | 20220066728 | A | 5/2022 |
| KR | 20220069204 | A | 5/2022 |

OTHER PUBLICATIONS

Young-Woon Byeon et al., "Review on Interface and Interphase Issues in Sulfide Solid-State Electrolytes for All-Solid-State Li-Metal Batteries", Electrochem 2021, 2, 452-471.

Yizhou Zhu et al., "Origin of Outstanding Stability in the Lithium Solid Electrolyte Materials: Insights from Thermodynamic Analyses Based on First-Principles Calculations", 2015, ACS Applied Materials & Interfaces, 7(42), 23685-23693.

* cited by examiner

SOLID-STATE ELECTROLYTE, LITHIUM BATTERY COMPRISING SOLID-STATE ELECTROLYTE, AND PREPARATION METHOD OF SOLID-STATE ELECTROLYTE

CROSS-REFERENCE TO RELATED APPLICATION

This application is based on and claims priority to Korean Patent Application No. 10-2022-0121146, filed on Sep. 23, 2022 and Korean Patent Application No. 10-2023-0121343, filed on Sep. 12, 2023, in the Korean Intellectual Property Office, and all the benefits accruing therefrom under 35 U.S.C. § 119, the content of which is incorporated by reference herein in its entirety.

BACKGROUND

1. Field

The disclosure relates to a solid-state electrolyte, a lithium battery including the same, and a method of preparing a solid-state electrolyte.

2. Description of the Related Art

Lithium batteries may provide improved specific energy (Wh/kg) and/or energy density (Wh/cc).

A lithium battery may include a solid-state electrolyte for improved stability. Solid-state electrolytes have decreased stability at a high voltage or have lower ionic conductivity than liquid electrolytes. Thus, there remains a need for an improved solid electrolyte.

SUMMARY

Provided is a novel solid-state electrolyte.

Provided is a lithium battery including the solid-state electrolyte.

Provided is a method of preparing the solid-state electrolyte.

Additional aspects will be set forth in part in the description which follows and, in part, will be apparent from the description, or may be learned by practice of the presented embodiments of the disclosure.

According to an aspect of the disclosure, a solid-state electrolyte includes:

a compound represented by Formula 1

$$Li_{5-4y}Al_{1-y}X_yO_{4-4y-\delta} \quad \text{Formula 1}$$

wherein in Formula 1, $0.1 \le y \le 0.8$ and $0 \le \delta < 1$, and X is Cl, Br, or a combination thereof, and wherein the compound is amorphous.

According to another aspect of the disclosure, a lithium battery may include a cathode; an anode; and an electrolyte between the cathode and the anode, wherein the cathode, the anode, and the electrolyte, or a combination thereof, may include the above-described solid-state electrolyte.

According to another aspect of the disclosure, a method of preparing a solid-state electrolyte including a compound represented by Formula 1, the method includes:

providing a first material including a crystalline $Li_5AlO_4$ and a lithium compound including a crystalline LiX, wherein X is Cl, Br, or a combination thereof; and mechanochemically contacting the first material and the lithium compound to prepare the amorphous compound represented by Formula 1

$$Li_{5-4y}Al_{1-y}X_yO_{4-4y-\delta} \quad \text{Formula 1}$$

wherein in Formula 1, $0.1 \le y \le 0.8$ and $0 \le \delta < 1$, and X is Cl, Br, or a combination thereof, to prepare the solid-state electrolyte comprising the compound represented by Formula 1.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
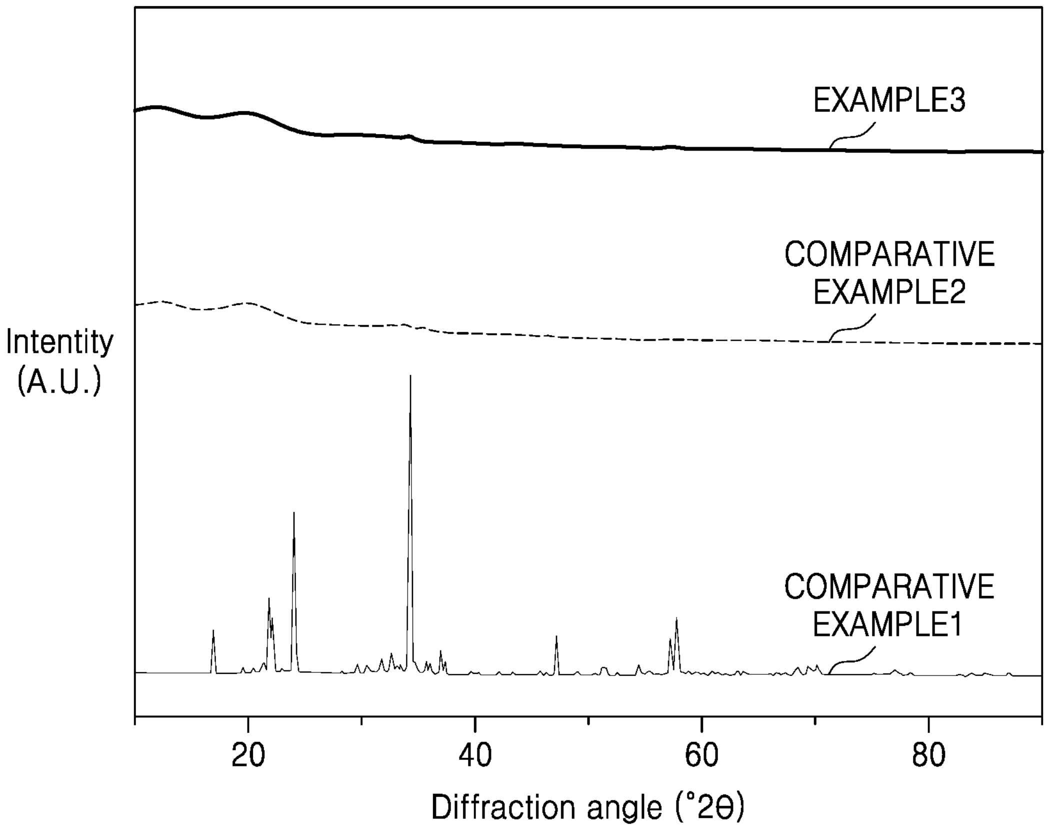
FIG. 1 is a graph of intensity (arbitrary units, a.u.) vs. diffraction angle (degrees two-theta (°2θ)) representing the results of X-ray diffraction analysis using CuKa radiation of electrolytes prepared in Comparative Example 1, Comparative Example 2, and Example 3.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list.

The present inventive concept, which will be more fully described hereinafter, may have various variations and various embodiments, and specific embodiments will be illustrated in the accompanied drawings and described in greater details. However, the present inventive concept should not be construed as being limited to specific embodiments set forth herein. Rather, these embodiments are to be understood as encompassing all variations, equivalents, or alternatives included in the scope of the present inventive concept. Rather, these embodiments are provided so that this disclosure will be thorough and complete, and will fully convey the scope of the invention to those skilled in the art. Like reference numerals refer to like elements throughout.

The terminology used hereinbelow is used for the purpose of describing particular embodiments only and is not intended to limit the present inventive concept. As used herein, the singular forms are intended to include the plural forms as well, unless the context clearly indicates otherwise. As used herein, the terms "comprises" and/or "comprising," or "includes" and/or "including" when used in this specification, specify the presence of stated features, regions, integers, steps, operations, elements, components, ingredients, materials, or combinations thereof, but do not preclude the presence or addition of one or more other features, regions, integers, steps, operations, elements, components, ingredients, materials, or combinations thereof. As used herein, "/" may be interpreted as "and", or as "or" depending on the context.

In the drawings, the thicknesses of layers and regions may be exaggerated for clarity and convenience of description. Like reference numerals denote like elements throughout the specification. When a component, such as a layer, a film, a region, or a plate, is described as being "above" or "on" another component, the component may be directly above the other component, or there may be yet another component therebetween. It will be understood that although the terms "first," "second," etc. may be used herein to describe various elements, these elements should not be limited by these terms. These terms are only used to distinguish one element from another element.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Endpoints of ranges may each be independently selected.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "metal" refers to both a metal and a metalloid such as silicon and germanium, in an elemental or ionic state.

As used herein, the term "alloy" means a mixture of two or more metals.

As used herein, the term "cathode active material" refers to a cathode material capable of undergoing lithiation and delithiation.

As used herein, the term "anode active material" refers to an anode material capable of undergoing lithiation and delithiation.

As used herein, the terms "lithiation" and "to lithiate" refer to a process of adding lithium to a cathode active material or an anode active material.

As used herein, the terms "delithiation" and "to delithiate" refer to a process of removing lithium from a cathode active material or an anode active material.

As used herein, the terms "charging" and "charge" refer to a process of providing electrochemical energy to a battery.

As used herein, the terms "discharging" and "discharge" refer to a process of removing electrochemical energy from a battery.

As used herein, the terms "positive electrode" and "cathode" refer to an electrode at which electrochemical reduction and lithiation take place during the discharging process.

As used herein, the terms "negative electrode" and "anode" refer to an electrode at which electrochemical reduction and delithiation take place during the discharging process.

As used herein, the term "particle diameter" of a particle refers to an average particle diameter if the particle is spherical, and for a particle that is non-spherical, said term refers to an average major axis length of the particle. The particle diameter of particles may be measured using a particle size analyzer (PSA). "Particle diameter" of particles may be, for example, an average diameter of the particles. The average particle diameter refers to a median particle diameter (D50) unless explicitly stated otherwise. The median particle diameter (D50) refers to a particle size corresponding to a cumulative volume of 50 vol % counted from the smallest particle size on a particle size distribution curve in which particles are accumulated from the smallest particle size to the largest particle size. The cumulative value may be, for example, cumulative volume. The median particle diameter may be measured by, for example, a laser diffraction method.

Hereinafter, a solid-state electrolyte according to an embodiment, a lithium battery including the same, and a method of preparing a solid-state electrolyte will be described in greater detail.

Figure 5:
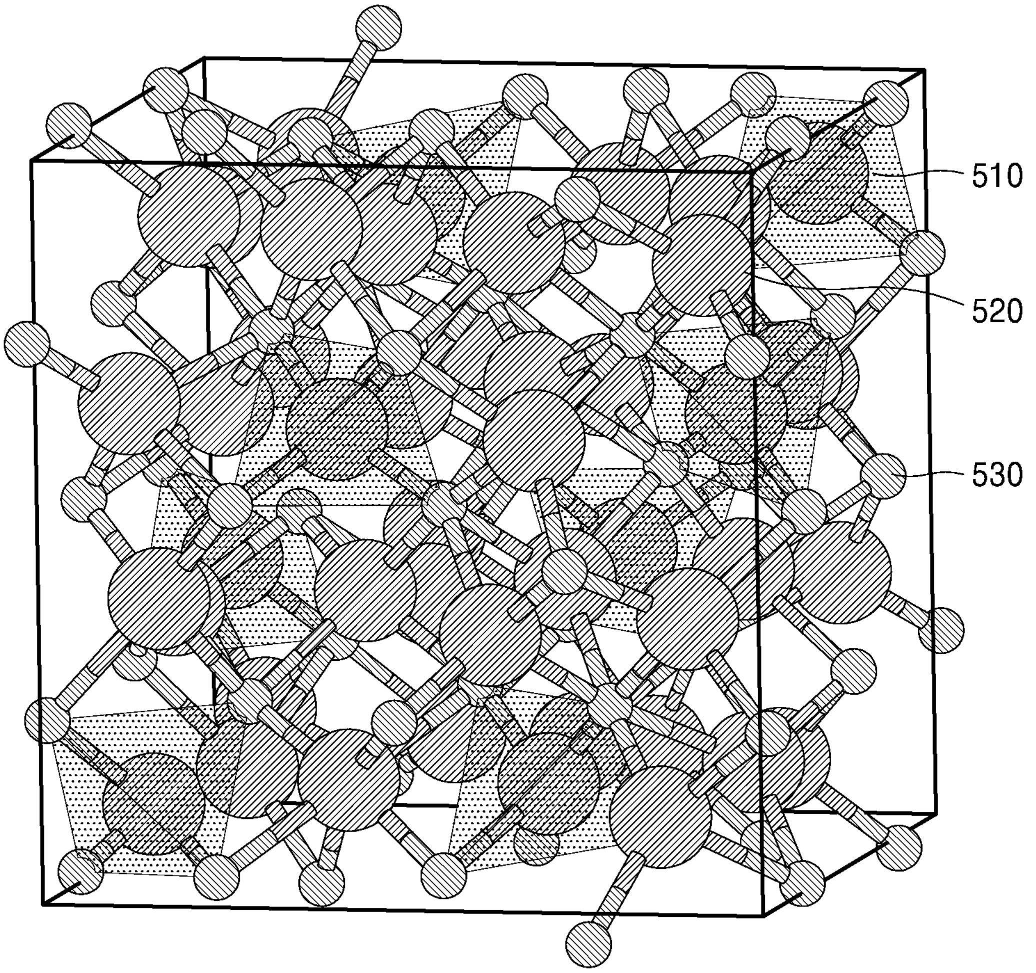
FIG. 5 is a schematic diagram of a crystal structure of a crystalline $Li_5AlO_4$.

Referring to FIG. 5, $Li_5AlO_4$ is a crystalline lithium metal oxide having a spinel-like crystal structure. As shown in FIG. 5, the crystalline lithium metal oxide has an aluminum atom 510, a lithium atom 520, an oxygen atom 530. $Li_5AlO_4$ is electrochemically stable at a high voltage of 5 V (vs. Li) or greater and is also chemically stable even in a high-temperature molten salt state. A crystalline $Li_5AlO_4$ has very low ionic conductivity at 25° C. of $1\times10^{-9}$ S/cm or less. Accordingly, there is a demand for a solid-state electrolyte having a wide electrochemical potential window as well as improved ionic conductivity.

Solid-State Electrolyte

A solid-state electrolyte according to an embodiment includes: a compound represented by Formula 1

$$Li_{5-4y}Al_{1-y}X_yO_{4-4y-\delta} \quad \text{Formula 1}$$

wherein in Formula 1, $0.1\leq y\leq 0.8$ and $0\leq\delta<1$, and X is Cl, Br, or a combination thereof, and wherein the compound is amorphous.

In Formula 1, for example, $0.1\leq y\leq 0.8$, $0.2\leq y\leq 0.8$, $0.3\leq y\leq 0.8$ or $0.4\leq y\leq 0.8$. In Formula 1, for example, $0.1\leq y\leq 0.75$, $0.2\leq y\leq 0.75$, or $0.3\leq y\leq 0.75$. X may be Cl, Br, or a combination of Cl and Br. The molar ratio of the combination of Cl and Br may be about 1:99 to about 99:1, about 10:90 to about 90:10, about 20:80 to about 80:20, about 30:70 to about 70:30, or about 40:60 to about 60:40. In Formula 1, for example, $\delta=0$ and $\delta$ represents an oxygen vacancy. The amorphous compound herein refers to a compound not having crystallinity or having very low crystallinity, and is distinguished from a crystalline compound. Amorphous, as used herein, means that the compound has less than 10 weight percent (wt %) crystalline content, e.g., 0.01 to 5 wt %, or 0.1 to 1 wt %, based on a total weight of the compound, when determined by X-ray powder diffraction analysis.

As the solid-state electrolyte containing the compound represented by Formula 1 is amorphous, lithium transfer within the solid-state electrolyte may be facilitated compared to when in a crystalline solid-state electrolyte. Since the solid-state electrolyte containing the compound represented by Formula 1 includes X (i.e., $X^-$), the interatomic distance is increased compared to a solid-state electrolyte not containing X, and thus, interactions between lithium ions and anions (e.g., oxygen ions) may be weakened and as a result, lithium transfer in the solid-state electrolyte may be further facilitated. By including the $X^-$ unit, the solid-state electrolyte containing the compound represented by Formula 1 may be electrochemically stable at a high voltage. By including both an $AlO_4^{2-}$ unit and the $X^-$ unit, the solid-state electrolyte containing the compound represented by Formula 1 may provide a mixed anion effect. As a result, the solid-state electrolyte containing the compound represented by Formula 1 may be electrochemically stable at a high voltage of about 3.0 volts (V) or greater (vs. lithium metal), e.g., about 3 V to about 7 V, about 3.5 V to about 6.5 V, about 4 V to about 6 V, or about 4.5 V to about 5.5 V (vs. lithium metal), and may also provide improved ionic conductivity.

The solid-state electrolyte that includes the compound represented by Formula 1 and is amorphous may include, for example, a compound represented by Formulas 2 to 4, $$Li_{5-4y}Al_{1-y}Cl_yO_{4-4y} \quad \text{Formula 2}$$

wherein in Formula 2, $0.2\leq y\leq 0.8$, $$Li_{5-4y}Al_{1-y}Br_yO_{4-4y} \quad \text{Formula 3}$$

wherein in Formula 3, $0.2\leq y\leq 0.8$, $$Li_{5-4y}Al_{1-y}Cl_{y1}Br_{y2}O_{4-4y} \quad \text{Formula 4}$$

wherein in Formula 4, $0.1\leq y\leq 0.8$, $0.1<y1<0.8$, $0.1<y2<0.8$, and $y=y1+y2$.

Referring to FIG. 1, the solid-state electrolyte containing the compound represented by Formula 1 has a first peak at a diffraction angle of 47.0±1.0° 2θ and a second peak at a diffraction angle of 35.0±1.0° 2θ, when analyzed by an X-ray diffraction (XRD) using CuKα radiation, wherein a ratio (Ib/Ia) of intensity (Ib) of the second peak to intensity (Ia) of the first peak may be about 3 or less, about 2.5 or less, about 2 or less, about 1.5 or less, about 1 or less, about 0.5 or less, or about 0.1 or less. The solid-state electrolyte containing the compound represented by Formula 1 may provide improved ionic conductivity by having the peak intensity ratio (Ib/Ia) in the above ranges.

Referring to FIG. 1, the solid-state electrolyte containing the compound represented by Formula 1 has the second peak at a diffraction angle of 35.0±1.0° 2θ and a third peak at a diffraction angle of 57.8±1.0° 2θ, when analyzed by an XRD using CuKα radiation, wherein a ratio (Ib/Ic) of the intensity (Ib) of the second peak to an intensity (Ic) of the third peak may be about 4 or less, about 3.5 or less, about 3 or less, about 2.5 or less, about 2 or less, about 1.5 or less, about 1.0 or less, about 0.5 or less, or about 0.1 or less. The solid-state electrolyte containing a compound represented by Formula 1 may provide improved ionic conductivity by having the peak intensity ratio (Ic/Ia) within the above ranges.

Referring to FIG. 1, a first full width at half maximum (FWHM, F1) of the first peak at the diffraction angle of 47.0±1.0°2θ in the XRD spectrum of the solid-state electrolyte containing the compound represented by Formula 1 may be greater than a second FWHM (F2) of a first peak at a diffraction angle of 47.0±1.0° 2θ in the XRD spectrum of a crystalline $Li_5AlO_4$ measured under a same condition as the solid-state electrolyte and using CuKα radiation. The solid-state electrolyte containing the compound represented by Formula 1 may provide improved ionic conductivity by having such a relationship between the first FWHM (F1) and the second FWHM (F2). The ratio (F1/F2) of the first FWHM (F1) to the second FWHM (F2) may be, for example, about 1.3 or greater, about 3 or greater, about 5 or greater, about 10 or greater, or about 13 or greater. The solid-state electrolyte containing the compound represented by Formula 1 may provide improved ionic conductivity by having the ratio (F1/F2) of the first FWHM (F1) to the second FWHM (F2) in the above ranges.

Referring to FIG. 1, a third full width at half maximum (FWHM, F3) of the second peak at the diffraction angle of 35.0±1.0° θ in the XRD spectrum of the solid-state electrolyte containing the compound represented by Formula 1 may be greater than a fourth FWHM (F4) of a second peak at a diffraction angle of 35.0±1.0° θ in the XRD spectrum of the crystalline $Li_5AlO_4$ measured under the same condition as the solid-state electrolyte and using CuKα radiation. The solid-state electrolyte containing the compound represented by Formula 1 may provide improved ionic conductivity by having such a relationship between the third FWHM (F3) and the fourth FWHM (F4). A ratio (F3/F4) of the third FWHM (F3) to the fourth FWHM (F4) may be, for example, about 1.3 or greater, about 2 or greater, about 3 or greater, about 4 or greater, or about 5 or greater. The solid-state electrolyte containing the compound represented by Formula 1 may provide improved ionic conductivity by having the ratio (F3/F4) between the third FWHM (F3) and the fourth FWHM (F4) in the above ranges.

Figure 2:
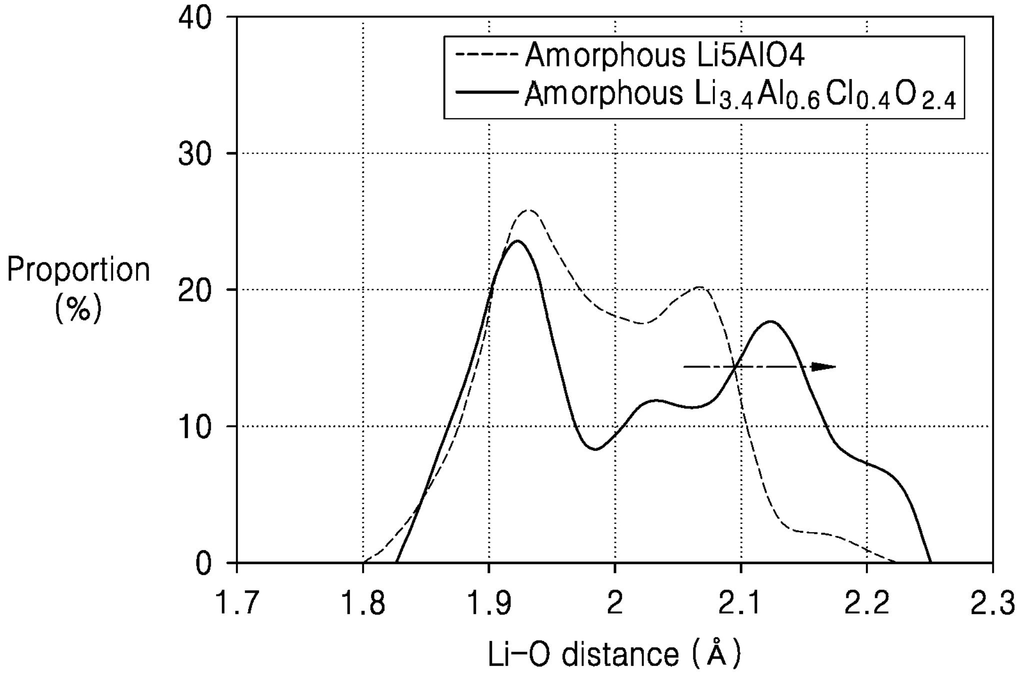
FIG. 2 is a graph of proportion (percent, %) vs. lithium to oxygen distance (angstroms, Å) showing the results of DFT (Density Functional Theory) analysis of lithium to oxygen atom distance for each of an amorphous $Li_5AlO_4$ and an amorphous $Li_{3.4}Al_{0.6}Cl_{0.4}O_{2.4}$.

Referring to FIG. 2, a first distance between a lithium atom and an oxygen atom in the compound represented by Formula 1 may be greater than a second distance between a lithium atom and an oxygen atom in the amorphous $Li_5AlO_4$. The first distance corresponds to a distance between lithium and oxygen atoms corresponding to a position of the peak having a second highest proportion of the lithium and oxygen atoms in a Li—O distance distribution curve (i.e., distance distribution curve of the lithium and oxygen atoms) of the lithium and oxygen atoms in the compound represented by Formula 1. The second distance corresponds to a distance between a lithium atom and an oxygen atom corresponding to a position of a peak having a second highest proportion of the lithium and oxygen atoms in a Li—O distance distribution curve of the lithium and oxygen atoms in the amorphous $Li_5AlO_4$. For example, the first distance may be greater than about 2.1 angstroms (Å). For example, the second distance may be less than about 2.1 Å. For example, as the first distance becomes greater than the second distance, lithium mobility in the solid-state electrolyte represented by Formula 1 overall increases, and as a result, improved ionic conductivity may be provided.

Figure 3:
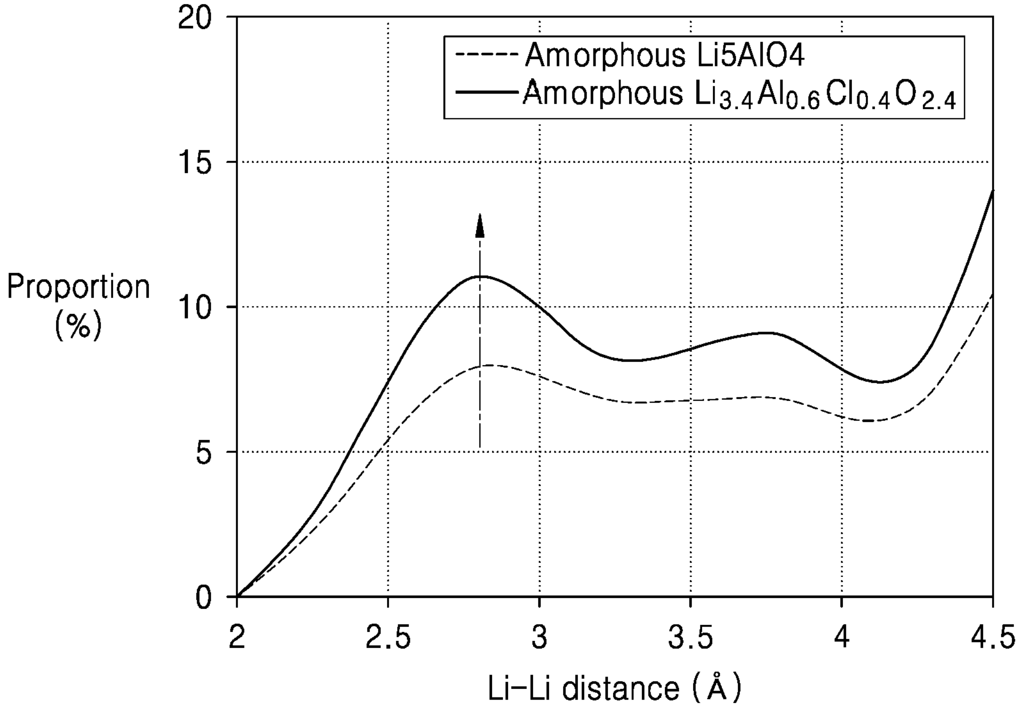
FIG. 3 is a graph of proportion (%) vs. lithium to lithium distance (Å) showing the results of DFT analysis of a distance between lithium atoms for each of the amorphous $Li_5AlO_4$ and the amorphous $Li_{3.4}Al_{0.6}Cl_{0.4}O_{2.4}$.

Referring FIG. 3, a proportion of lithium atoms having a third distance between the lithium atoms in the compound represented by Formula 1 may be greater than a proportion of lithium atoms having a fourth distance between the lithium atoms in amorphous $Li_5AlO_4$. The proportion of the lithium atoms having the third distance is a proportion of the lithium atoms having a distance of about 2.5 Å to about 3.5 Å in a Li—Li distance distribution curve (i.e., distance distribution curve of the lithium atoms) in the compound represented by Formula 1. The proportion of the lithium atoms having the fourth distance is a proportion of the lithium atoms having a distance of about 2.5 Å to about 3.5 Å in a Li—Li distance distribution curve in the amorphous $Li_5AlO_4$. For example, as the proportion of the lithium atoms having the third distance becomes greater than the proportion of the lithium atoms having the fourth distance, the proportion of lithium diffusion sites increases, and improved ionic conductivity may be provided.

The compound represented by Formula 1 may include, for example, an ion conductor and the ion conductor may include an $AlO_4^{5-}$ unit and an $X^-$ unit. A proportion of the $AlO_4^{5-}$ unit may be for example, about 20% to about 90%, about 20% to about 80%, about 20% to about 70%, about 20% to about 60%, or about 30% to about 60%, relative to a total content of the $AlO_4^{5-}$ unit and the $X^-$ unit in the compound represented by Formula 1. The proportion of the $X^-$ unit may be for example, about 10% to about 80%, about 20% to about 80%, about 30% to about 80%, about 40% to about 80%, or about 45% to about 75%, relative to the total content of the $AlO_4^{5-}$ unit and the $X^-$ unit in the compound represented by Formula 1. The proportion of the $AlO_4^{5-}$ unit may be about 20% to about 90%, and the proportion of the $X^-$ unit may be about 10% to about 80%. The symbol "%" used herein to indicate proportions of the $AlO_4^{5-}$ unit and the $X^-$ unit refers to mol percent (mol %). The contents of the $AlO_4^{5-}$ unit and the $X^-$ unit may be measured, for example, by induced coupled plasma (ICP) analysis.

Lithium may be randomly placed within the compound represented by Formula 1. Such random placement of the lithium inside the compound represented by Formula 1 may further improve the ionic conductivity of the solid-state electrolyte containing the compound represented by Formula 1. Referring to FIG. 5, a regular arrangement of lithium within a crystalline $Li_5AlO_4$ may limit the ionic conductivity of the crystalline $Li_5AlO_4$.

The solid-state electrolyte containing the compound represented by Formula 1 may have an ionic conductivity at 25° C. of about $1\times10^{-7}$ siemens per centimeter (S/cm) or greater, $1.3\times10^{-7}$ S/cm or greater, about $2\times10^{-7}$ S/cm or greater, or about $3\times10^{-7}$ S/cm or greater. The solid-state electrolyte containing the compound represented by Formula 1 may have an ionic conductivity at 25° C. of about $1\times10^{-7}$ S/cm to about $1\times10^{-2}$ S/cm, about $1.3\times10^{-7}$ S/cm to about $1\times10^{-3}$ S/cm, about $2\times10^{-7}$ S/cm to about $1\times10^{-3}$ S/cm, or about $3\times10^{-7}$ S/cm to about $1\times10^{-3}$ S/cm. By having an increased ionic conductivity in the above ranges, the solid-state electrolyte containing the compound represented by Formula 1 may be used as an electrolyte of a lithium battery.

The solid-state electrolyte containing the compound represented by Formula 1 may have a lithium diffusion barrier of 625 millielectronvolts (meV) or less, 600 meV or less, 580 meV or less, 560 meV or less, 540 meV or less, 520 meV or less, or 500 meV or less. The solid-state electrolyte containing the compound represented by Formula 1 may have a lithium diffusion barrier of about 10 meV to about 625 meV, about 100 meV to about 600 meV, about 100 meV to about 580 meV, about 100 meV to about 560 meV, about 100 meV to about 540 meV, about 100 meV to about 520 meV, or about 100 meV to about 500 meV. By having such a low lithium diffusion barrier in the above ranges, the solid-state electrolyte containing the compound represented by Formula 1 may facilitate lithium diffusion within the solid-state electrolyte and improve ion conductivity of the solid-state electrolyte.

The solid-state electrolyte containing the compound represented by Formula 1 may be free of LiI or iodine (I). The solid-state electrolyte containing the compound represented by Formula 1 may deliberately not contain LiI or iodine (I). Due to the absence of LiI or iodine (I) in the solid-state electrolyte containing the compound represented by Formula 1, the solid-state electrolyte may be electrochemically stable at a voltage of about 3.0 V or greater as compared to lithium metal. Iodine (I), for example, iodine ion ($I^-$), due to its low electronegativity, may be easily oxidized at a high voltage of about 3.0 V or greater as compared to lithium metal and cause a side reaction. In addition, even when forming a new compound with $Li_5AlO_4$, iodine (I) may exist in a form of iodine ion ($I^-$) and may still be easily oxidized and cause a side reaction. As a result, the solid-state electrolyte may be easily degraded during the process of charging and discharging at a voltage of about 3.0 V or greater.

In the compound represented by Formula 1, an ionic radius of X may be greater than an ionic radius of oxygen ($O^{2-}$). The ionic radius of oxygen ($O^{2-}$) may be, for example, about 126 picometers (pm), the ionic radius of $Cl^-$ may be, for example, about 167 pm, and the ionic radius of about $Br^-$ may be, for example, about 182 pm. In the compound represented by Formula 1, as the ionic radius of X is greater than the ionic radius of oxygen ($O^{2-}$), the interatomic distance increases, diminishing interactions between lithium ions and anions, and as a result, the mobility of lithium ions may be further improved. In the compound represented by Formula 1, the ionic radius of X (e.g., $X^-$ ion) may be, for example, about 130 pm to about 205 pm, or about 150 pm to about 200 pm.

The form of the solid-state electrolyte containing a compound represented by Formula 1 is not limited to any particular form. The solid-state electrolyte containing the compound represented by Formula 1 may be in a form of particles, for example. The particles may be spherical particles or non-spherical particles. The solid-state electrolyte in the form of particles may be formed into various shapes. The formed solid-state electrolyte may be in the form of a sheet, for example.

Lithium Battery

A lithium battery according to another embodiment may include a cathode; an anode; and an electrolyte between the cathode and the anode, wherein the cathode, the anode, the electrolyte, or a combination thereof, may include the above-described solid-state electrolyte. The above-described solid-state electrolyte may include the compound represented by Formula 1. By including the above-described solid-state electrolyte, the lithium battery may have decreased internal resistance and improved cycle characteristics. The lithium battery is not particularly limited and may be, for example, a lithium ion battery, a solid-state battery, a multilayer ceramic (MLC) battery, or a lithium air battery. Some of the aforementioned batteries will be described in more detail below.

(Lithium Ion Battery)

Figure 6:
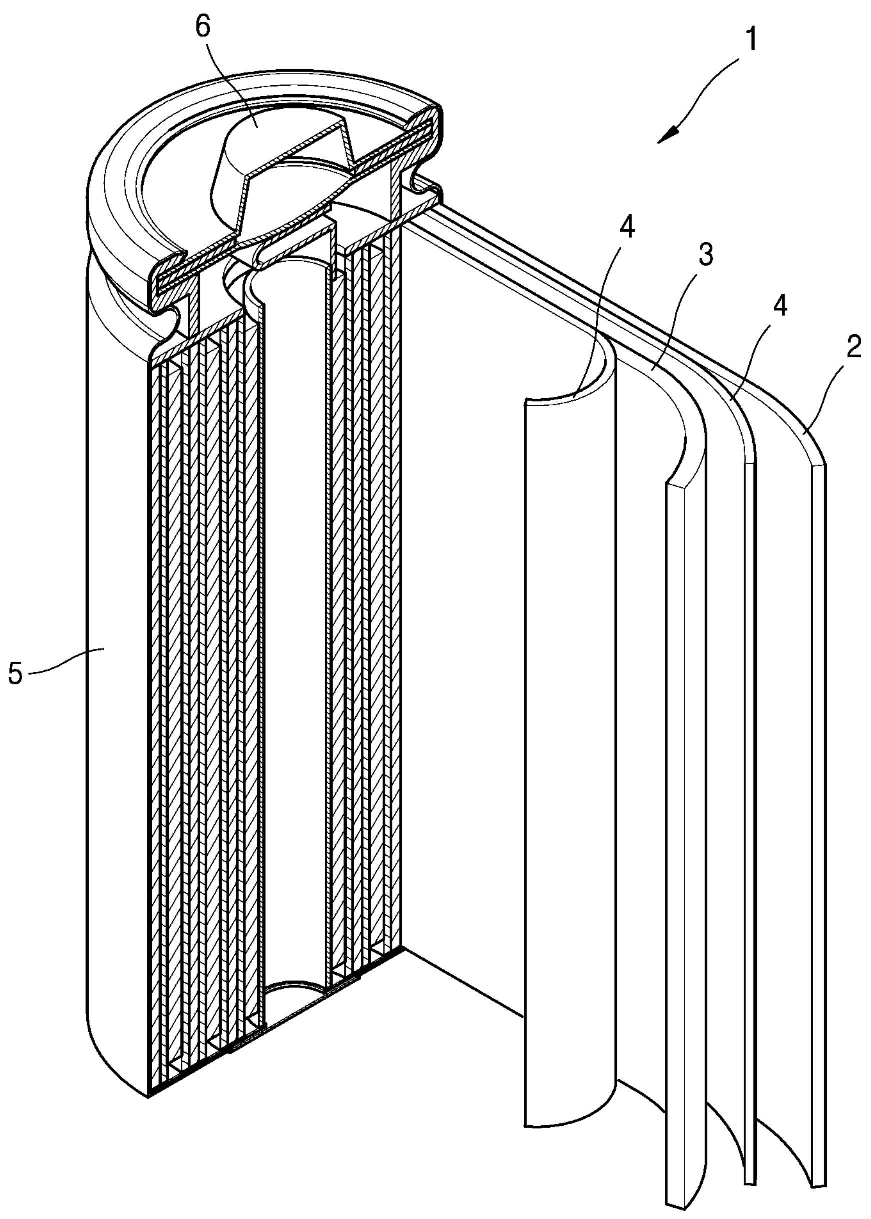
FIG. 6 is a schematic diagram of an embodiment of a structure of a lithium ion battery.
Figure 7:
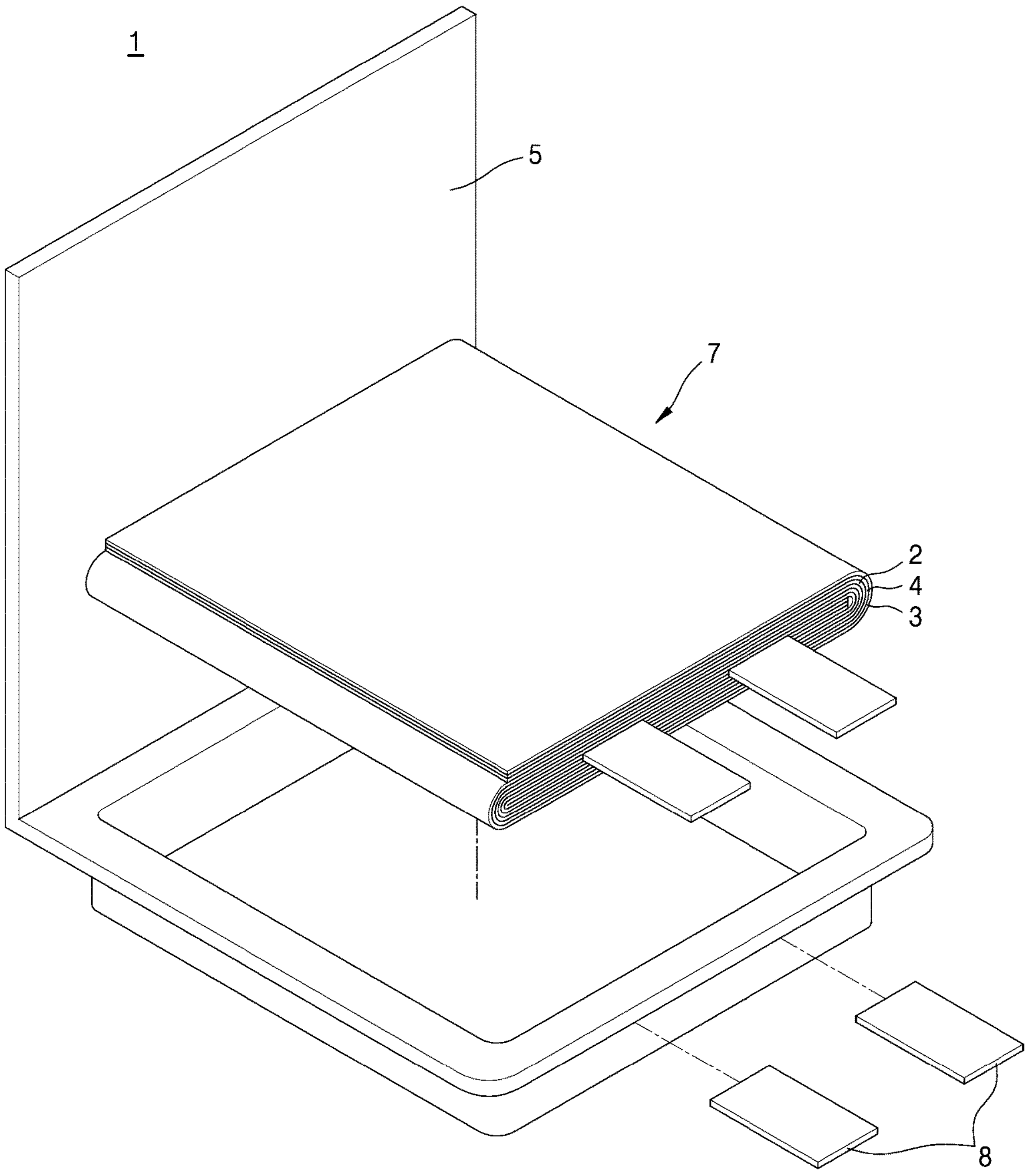
FIG. 7 is a schematic diagram of an embodiment of a structure of a lithium ion battery.
Figure 8:
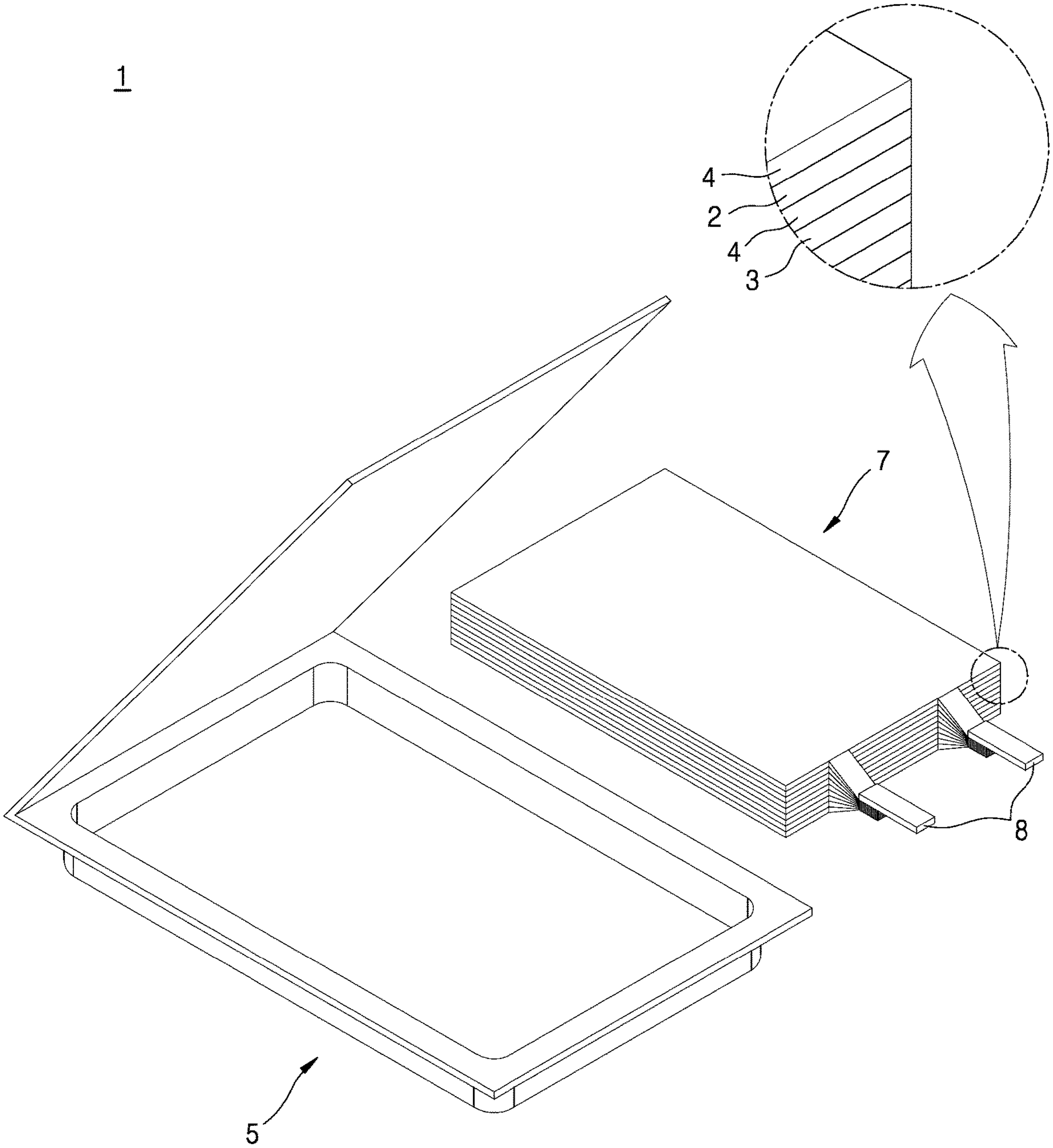
FIG. 8 is a schematic diagram of an embodiment of a structure of a lithium ion battery.

FIGS. 6 to 8 are each a schematic diagram of a lithium ion battery according to an embodiment.

For example, the lithium ion battery may be a lithium battery including a liquid electrolyte. The lithium ion battery may include the solid-state electrolyte containing the compound represented by Formula 1.

For example, the lithium ion battery may include a cathode including a cathode active material; an anode including an anode active material; and a liquid electrolyte between the cathode and the anode, wherein the cathode, the anode, or a combination thereof, may include the solid-state electrolyte containing the compound represented by Formula 1. For example, the lithium ion battery may include a cathode, an anode, and a liquid electrolyte between the cathode and the anode, wherein a protection layer including the solid-state electrolyte containing the compound represented by Formula 1 may be disposed on a side of the cathode, the anode, or a combination thereof. For example, the lithium ion battery may include a cathode active material layer, and the cathode active material layer may include: a core including a cathode active material; and a composite cathode active material including a first coating layer disposed on the core, wherein the first coating layer may include the solid-state electrolyte containing the compound represented by Formula 1. For example, the lithium ion battery may include an anode active material layer, and the anode active material layer may include: a core including an anode active material; and a composite anode active material including a second coating layer disposed on the core, wherein the second coating layer may include the solid-state electrolyte containing the compound represented by Formula 1.

For example, the lithium ion battery may be prepared as follows.

First, a cathode may be prepared. A cathode active material, a conductive material, a binder, and a solvent may be mixed together to produce a cathode active material composition. The cathode active material composition may be directly coated on the cathode current collector and the coated cathode current collector may be dried to form a cathode. Or, the cathode active material composition may be cast on a separate support, and a film obtained by exfoliating the cathode active material composition from the support may be laminated on the cathode current collector to form a cathode. Alternatively, the cathode active material composition may be prepared in a form of an electrode ink containing an excess amount of solvent, and then printed on a support by an ink-jet technique or Gravure printing technique, to form a cathode. The printing technique is not limited to the aforementioned techniques and may be any suitable method available for general coating and printing.

The solid-state electrolyte containing the compound represented by Formula 1 may be coated on a side of a cathode active material layer included in a cathode to thereby form a cathode protection layer. Alternatively, solid-state electrolyte particles containing the compound represented by Formula 1 may be added to the cathode active material composition and thus included in the cathode active material layer.

The cathode current collector may include a metal substrate. Examples of the cathode current collector may include a plate, or a foil, made of aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof. The cathode current collector may be omitted. The cathode current collector may further include a carbon layer disposed on one side or both sides of the metal substrate. By having the carbon layer further disposed on the metal substrate, it is possible to prevent a metal in the metal substrate from being corroded by a solid-state electrolyte included in a cathode layer, and to reduce an interfacial resistance between the cathode active material layer and the cathode current collector. For example, the carbon layer may have a thickness of about 0.1 micrometer (μm) to about 5 μm, about 0.1 μm to about 3 μm, or about 0.1 μm to about 1 μm. When the thickness of the carbon layer is excessively thin, it may be difficult to completely block the contact between the metal substrate and the solid-state electrolyte. When the thickness of the carbon layer is too thick, energy density of the solid-state secondary battery may be decreased. The carbon layer may include amorphous carbon, crystalline carbon, or a combination thereof.

For the cathode active material, any suitable material used in the art as a cathode active material may be used. For example, the cathode active material may be a lithium transition metal oxide, a transition metal sulfide, or a combination thereof. For example, the cathode active material may be at least one composite oxides of lithium, with a metal of cobalt, manganese, nickel, or a combination thereof. Specifically, the cathode active material may use a compound represented by any one of the following formulas: $Li_aA_{1-b}B'_bD_2$ (In the formula, 0.90≤a≤1.8, and 0≤b≤0.5); $Li_aE_{1-b}B'_bO_{2-c}D'_c$ (In the formula, 0.90≤a≤1.8, 0≤b≤0.5, and 0≤c≤0.05); $LiE_{2-b}B'_bO_{4-c}D'_c$ (In the formula, 0≤b≤0.5, and 0≤c≤0.05); $Li_aNi_{1-b-c}Co_bB'_cD'_\alpha$ (In the formula, 0.90≤a≤1.8, 0≤b≤0.5, 0≤c≤0.05, and 0<α≤2); $Li_aNi_{1-b-c}Co_bB'_cO_{2-\alpha}F'_\alpha$ (In the formula, 0.90≤a≤1.8, 0≤b≤0.5, 0≤c≤0.05, and 0<α<2); $Li_aNi_{1-b-c}Co_bB'_cO_{2-\alpha}F'_2$ (In the formula, 0.90≤a≤1.8, 0≤b≤0.5, 0≤c≤0.05, and 0<α<2); $Li_aNi_{1-b-c}Mn_bB'_cD'_\alpha$ (In the formula, 0.90≤a≤1.8, 0≤b≤0.5, 0≤c≤0.05, and 0<α≤2); $Li_aNi_{1-b-c}Mn_bB'_cO_{2-\alpha}F'_\alpha$ (In the formula, 0.90≤a≤1.8, 0≤b≤0.5, 0≤c≤0.05, and 0<α<2); $Li_aNi_{1-b-c}Mn_bB'_cO_{2-\alpha}F'_2$ (In the formula, 0.90≤a≤1.8, 0≤b≤0.5, 0≤c≤0.05, and 0<α<2); $Li_aNi_bE_cG_dO_2$ (in the formula, 0.90≤a≤1.8, 0≤b≤0.9, 0≤c≤0.5, and 0.001≤d≤0.1); $Li_aNi_bCo_cMn_dGeO_2$ (In the formula, 0.90≤a≤1.8, 0≤b≤0.9, 0≤c≤0.5, 0≤d≤0.5, and 0.001≤e≤0.1); $Li_aNiG_bO_2$ (In the formula, 0.90≤a≤1.8, and 0.001≤b≤0.1); $Li_aCoG_bO_2$ (In the formula, 0.90≤a≤1.8, and 0.001≤b≤0.1); $Li_aMnG_bO_2$ (In the formula, 0.90≤a≤1.8, and 0.001≤b≤0.1); $Li_aMn_2G_bO_4$ (In the formula, 0.90≤a≤1.8, and 0.001≤b≤0.1); $QO_2$; $QS_2$; $LiQS_2$; $V_2O_5$; $LiV_2O_2$; $LiI'O_2$; $LiNiVO_4$; $Li_{(3-f)}J_2(PO_4)_3$(0≤f≤2); $Li_{(3-f)}Fe_2(PO_4)_3$(0≤f≤2); $LiFePO_4$, or a combination thereof. In the above formulas, A is Ni, Co, Mn, or a combination thereof; B' is Al, Ni, Co, Mn, Cr, Fe, Mg, Sr, V, an rare-earth element, or a combination thereof; D' is O, F, S, P, a combination thereof; E is Co, Mn, a combination thereof; F' is F, S, P, a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. Examples may include $LiCoO_2$, $LiMn_xO_{2x}$ (x=1, or 2), $LiNi_{1-x}Mn_xO_{2x}$ (0<x<1), $Ni_{1-x-y}Co_xMn_yO_2$ (0≤x≤0.5, 0≤y≤0.5), $LiFePO_4$, $TiS_2$, $FeS_2$, $TiS_3$, $FeS_3$, or a combination thereof. For example, a conductive composition represented by Formula 1 may be coated on a surface of the cathode active material to inhibit a side reaction between the cathode active material and an electrolyte solution.

The conductive material may include, for example, carbon black, carbon fiber, graphite, or a combination thereof. The carbon black may be, for example, acetylene black, Ketjen black, super P carbon, channel black, furnace black, lamp black, thermal black, or combinations thereof. The graphite may be natural graphite or artificial graphite. A combination containing at least one of the aforementioned materials may be used. The cathode may further include an additional conductive material other than the carbonaceous conductive materials described above. Examples of the additional conductive material may include electrically conductive fibers such as metal fibers; metal powders such as fluorocarbon powder, aluminum powder or nickel powder; conductive whiskers such as zinc oxide or potassium titanate; or a polyethylene derivative. A combination containing at least one of the aforementioned conductive materials may be used. A content of the conductive material may be about 1 part by weight to about 10 parts by weight, or about 2 parts by weight to about 7 parts by weight, based on 100 parts by weight of a cathode active material. When the content of the conductive material is within this range, for example, within a range of about 1 part by weight to about 10 parts by weight, the electrical conductivity of the cathode may be appropriate.

A binder may improve adhesion between components of the cathode and adhesion with respect to the cathode current collector. Examples of the binder may include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. A content of the binder may be about 1 part by weight to about 10 parts by weight, or about 2 parts by weight to about 7 parts by weight, based on 100 parts by weight of the cathode active material. As the content of the binder is within the above ranges, adhesion of the cathode active material layer with the cathode current collector may be further improved, and a decrease in energy density of the cathode active material layer may be inhibited.

Examples of the solvent may include N-methylpyrrolidone (NMP), acetone, or water. The respective contents of the cathode active material, the conductive material, the binder, and the solvent are at a level commonly used in lithium batteries.

A plasticizer may be added to the cathode active material composition to form pores inside the cathode active material layer.

Next, an anode may be prepared. An anode active material, a conductive material, a binder, and a solvent may be mixed together to produce an anode active material composition. The anode active material composition may be directly coated on a copper current collector, and the coated copper current collector may be dried to form the anode. Or, the anode active material composition may be cast on a separate support, and a film obtained by exfoliating the anode active material composition from the support may be laminated on the copper current collector to form the anode. Alternatively, the anode active material composition may be prepared in the form of an electrode ink containing an excess amount of solvent, and then printed on a support by an ink-jet technique or Gravure printing technique, to form the anode. The printing technique is not limited to the aforementioned techniques and may be any suitable method available for coating and printing.

Examples of the anode active material may include a lithium metal, a lithium metal alloy, a metal alloyable with lithium, a transition metal oxide, a non-transition metal oxide, a carbonaceous material, or a combination thereof. The lithium metal alloy may be an alloy of lithium with a different metal such as indium. Examples of the metal alloyable with lithium may include Si, Sn, Al, Ge, Pb, Bi, Sb, a Si—Y' alloy (wherein Y' is an alkali metal, an alkaline earth metal, an element of Group 13, an element of Group 14, a transition metal, a rare earth metal, or a combination thereof, but not Si), a Sn—Y' alloy (wherein Y' is an alkali metal, an alkaline earth metal, an element of Group 13, an element of Group 14, a transition metal, a rare earth metal, or a combination thereof, but not Sn) or a combination thereof. Here, Y' may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof. The transition metal oxide may be, for example, a lithium titanium oxide, a vanadium oxide, a lithium vanadium oxide, or a combination thereof. The non-transition metal oxide may be, for example, $SnO_2$, $SiO_x$ ($0<x<2$), or a combination thereof. The carbonaceous material may be, for example, a crystalline carbon, an amorphous carbon, or a mixture thereof. Examples of the crystalline carbon may include graphite, including artificial graphite or natural graphite in shapeless, plate, flake, spherical or fiber form. Examples of the amorphous carbon may include soft carbon (low-temperature calcined carbon) or hard carbon, mesophase pitch carbides, calcined cokes, or a combination thereof. The anode active material may be, for example, lithium metal, a lithium metal alloy, or a combination thereof.

The conductive material, binder, and solvent used in the preparation of the anode may be selected from among materials for use in the preparation of a cathode plate. The respective amounts of the anode active material, the conductive material, the binder, and the solvent are at a level suitably used in lithium batteries.

A plasticizer may be added to the anode active material composition to form pores inside the anode active material layer.

A protection layer including the solid-state electrolyte containing the compound represented by Formula 1 may be disposed on a side of the anode active material layer. Alternatively, the anode active material may include: a core including lithium metal, a lithium metal alloy, or a combination thereof; and anode active material particles including a first coating layer disposed on the core, wherein the coating layer may include the solid-state electrolyte containing the compound represented by Formula 1. As such a protection layer and/or coating layer is disposed on the anode, lithium ion conductivity and/or stability with respect to lithium metal of the anode may be improved Alternatively, solid-state electrolyte particles containing the compound represented by Formula 1 may be added to the anode active material composition and thus included within the anode active material layer.

Next, a separator may be prepared.

The cathode and the anode may be separated by a separator, and as the separator, any separator commonly used in lithium batteries may be used. Any separator capable of retaining a large quantity of electrolyte solution while exhibiting low resistance to ion migration in electrolyte may be suitable. For example, the separator may be any material of glass fiber, polyester, Teflon, polyethylene, polypropylene, polytetrafluoroethylene (PTFE), or a combination thereof. In addition, the separator may be in a form of nonwoven fabric or woven fabric. More specifically, a lithium ion battery may include a rollable separator formed of polyethylene, polypropylene, and a lithium ion polymer battery may include a separator having excellent organic liquid electrolyte immersion capability.

The separator may be prepared as follows. Once a separator composition is prepared by mixing a polymer resin, a filler, and a solvent, the separator composition may be directly coated on an electrode and the coated electrode may be dried, to thereby form a separator film. Or, the separator composition may be cast on a support and the cast support may be dried, and a separator film exfoliated from the support may be laminated on an electrode. The polymer resin is not limited to any particular material, and may be any suitable material used as a binder of an electrode plate. For example, a vinylidene fluoride/hexafluoropropylene copolymer, polyvinylidene fluoride, polyacrylonitrile, polymethyl methacrylate, or a mixture thereof may be used for the polymer resin. It may be suitable to use a vinylidene fluoride/hexafluoropropylene copolymer having about 8 wt % to about 25 wt % of hexafluoropropylene.

The separator may include the solid-state electrolyte containing the compound represented by Formula 1. For example, at least one side of the separator may further include a coating layer including the solid-state electrolyte containing the compound represented by Formula 1. As the separator further includes the coating layer, heat resistance and dimensional stability of the separator may be further improved. For example, the separator may include a porous substrate; and a coating layer disposed on one side or both sides of the porous substrate, wherein the coating layer may include the solid-state electrolyte containing the compound represented by Formula 1.

Next, a liquid electrolyte may be prepared.

The liquid electrolyte may be an organic electrolyte solution including an organic solvent. The organic electrolyte solution may be prepared by dissolving a lithium salt in an organic solvent. The organic solvent may be any suitable material that can be used as an organic solvent in the art. Examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or mixtures thereof. The lithium salt may be any suitable material that can be used as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (Here, x and y are different from each other and each independently an integer of 1 to 20), LiCl, LiI, or a mixture thereof. A concentration of the lithium salt may be, without being strictly limited to, about 0.1 molar (M) to about 10 M, or about 0.1 M to about 5 M and may be appropriately modified in a range that provides improved battery performance. For example, the liquid electrolyte may further include a flame retardant, such as a phosphorus-based flame retardant, a halogen-based flame retardant, and the like.

Referring to FIG. 6, a lithium ion battery 1 according to an embodiment may include a cathode 3, the above-described anode 2, and a separator 4. The cathode 3, the anode 2, and the separator 4 may be wound or folded to thereby form a battery structure 7. The battery structure 7 may be accommodated in a battery case 5. The battery case 5 may be injected with a cathode electrolyte forming composition, which is crosslinked, and sealed with a cap assembly 6 to thereby form a lithium metal battery 1. The battery case 5 may have a cylindrical shape, but is not necessarily limited thereto, and may have a polygonal shape, or a thin-film shape.

Referring to FIG. 7, a lithium ion battery 1 according to an embodiment may include a cathode 3, the above-described anode 2, and a separator 4. The separator 4 may be disposed between the cathode 3 and the anode 2, and the cathode 3, the anode 2, and the separator 4 may be wound or folded to form a battery structure 7. The battery structure 7 may be accommodated in a battery case 5. An electrode tab 8, acting as an electrical path for guiding an electrical current formed in the battery structure 7 to the outside, may be included. The battery case 5 may be injected with a cathode electrolyte forming composition, which is crosslinked, and sealed to thereby form a lithium ion battery 1. The battery case 5 has a polygonal shape, but is not necessarily limited thereto, and may have a cylindrical shape, or a thin-film shape.

Referring to FIG. 8, a lithium ion battery 1 according to an embodiment may include a cathode 3, the above-described anode 2, and a separator 4. The separator 4 may be disposed between the cathode 3 and the anode 2 to form a battery structure. The battery structure 7 may be stacked in a bi-cell structure and then accommodated in a battery case 5. An electrode tab 8, acting as an electrical path for guiding an electrical current formed in the battery structure 7 to the outside, may be included. The battery case 5 may be injected with a cathode electrolyte forming composition, which is crosslinked, and sealed to thereby form a lithium ion battery 1. The battery case 5 has a polygonal shape, but is not necessarily limited thereto, and may have a cylindrical shape, or a thin-film shape.

A pouch-type lithium ion battery may be formed by using a pouch as the case for the lithium ion battery in FIGS. 6 to 8. The pouch-type lithium ion battery may include one or more battery structures. A separator may be disposed between a cathode and an anode, to thereby form a battery structure. The battery structures may be stacked in a thickness direction and immersed in an organic electrolyte solution, and then accommodated and sealed in a pouch to thereby form a pouch-type lithium ion battery. For example, although not illustrated in the drawings, the above-described cathode, anode, and separator may be simply stacked and then accommodated in a pouch in the form of an electrode assembly, or may be wound or folded into an electrode assembly in the form of a jelly roll and then accommodated in a pouch. Subsequently, the pouch may be injected with a cathode electrolyte forming composition, thermally crosslinked, and then sealed to thereby form a lithium ion battery.

The lithium ion battery may have excellent discharge capacity and lifetime characteristics, and high energy density, and thus may be used in an electric vehicle (EV), for example. For example, the lithium ion battery may be used in a hybrid vehicle, such as a plug-in hybrid electric vehicle (PHEV). Also, the lithium ion battery may be used in any field that desires a large amount of energy storage. For example, the lithium ion battery may be used in an electric bicycle, or a power tool.

A plurality of lithium ion batteries may be stacked to form a battery module, and a plurality of battery modules may form a battery pack. Such a battery pack may be utilized in all types of devices in which high capacity and high output are desired. For example, such a battery pack may be used in a laptop computer, a smartphone, or an electric vehicle. The battery module may include, for example, a plurality of batteries and a frame holding the batteries. The battery pack may include, for example, a plurality of battery modules, and a bus bar connecting the battery modules. The battery module and/or battery pack may further include a cooling device. A plurality of battery packs may be managed by a battery management system. The battery management system may include a battery pack and a battery control device connected to the battery pack.

(Solid-State Battery)

For example, a solid-state battery may be a battery including a solid-state electrolyte. The solid-state battery may include the solid-state electrolyte comprising the compound represented by Formula 1.

For example, the solid-state battery may include a cathode including a cathode active material; an anode including an anode active material; and a liquid electrolyte between the cathode and the anode, wherein the cathode, the anode, or a combination thereof, may include the solid-state electrolyte containing the compound represented by Formula 1. For example, the solid-state battery may include a cathode active material layer, and the cathode active material layer may include the solid-state electrolyte containing the compound represented by Formula 1. For example, the solid-state battery may include an anode active material layer, and the anode active material layer may include the solid-state electrolyte containing the compound represented by Formula 1. The solid-state battery may include a solid-state electrolyte layer disposed between a cathode and an anode, and the solid-state electrolyte layer may include the solid-state electrolyte containing the compound represented by Formula 1. For example, the solid-state battery may include a cathode active material layer, and the cathode active material layer may include: a core including a cathode active material; and a composite cathode active material including a first coating layer disposed on the core, wherein the first coating layer may include the solid-state electrolyte comprising the compound represented by Formula 1. For example, the solid-state battery may include an anode active material layer, and the anode active material layer may include: a core including an anode active material; and a composite anode active material including a second coating layer disposed on the core, wherein the second coating layer may include the solid-state electrolyte comprising the compound represented by Formula 1.

(Type 1: Solid-State Battery Employing Non-Precipitation Type Anode)

Figure 9:
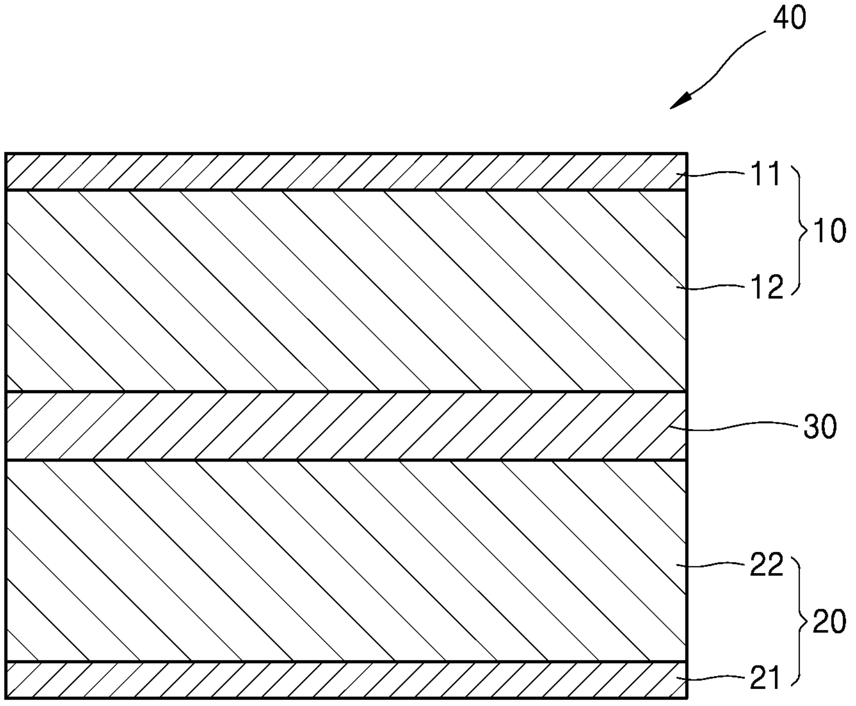
FIG. 9 is a schematic diagram of an embodiment of a structure of a solid-state battery.

FIG. 9 is a schematic diagram of a solid-state battery including a non-precipitation type anode according to an embodiment. In the solid-state battery including the non-precipitation type anode, an initial charge capacity of an anode active material layer at the beginning of charging may be, for example, about 50% or greater, about 60% or greater, about 70% or greater, about 80% or greater, about 90% or greater, or about 100% or greater, relative to the initial charge capacity of a cathode active material layer.

The solid-state type lithium battery may be prepared as follows.

First, a solid-state electrolyte layer may be prepared. The solid-state electrolyte layer may include a solid-state electrolyte. For example, the solid-state electrolyte layer may be prepared by mixing and drying of the solid-state electrolyte containing the compound represented by Formula 1 and a binder, or may be prepared by compression of the electrolyte powder containing the compound represented by Formula 1 into a particular form. For example, the solid-state electrolyte layer may be prepared by mixing and drying of the solid-state electrolyte containing the compound represented by Formula 1, a sulfide-based (i.e., sulfide) and/or oxide-based (i.e., oxide) solid-state electrolyte, and a binder.

Alternatively, the solid-state electrolyte layer may be prepared by compression of the solid-state electrolyte powder containing the compound represented by Formula 1 and the sulfide-based and/or oxide-based solid-state electrolyte powder into a particular form. For example, the solid-state electrolyte layer may be prepared by mixing and drying of the sulfide-based and/or oxide-based solid-state electrolyte and the binder, or may be prepared by compression of the sulfide-based and/or oxide-based electrolyte powder into a particular form.

For example, the solid-state electrolyte may be deposited using a film formation method by blasting, aerosol deposition, cold spraying, sputtering, chemical vapor deposition, or spraying, and the solid-state electrolyte layer may be formed thereby. In addition, the solid-state electrolyte layer may be formed by compressing the solid-state electrolyte. In addition, the solid-state electrolyte layer may be formed by mixing the solid-state electrolyte, a solvent, and a binder or a substrate and compressing the resulting mixture. In this case, the solvent or the substrate may be added to reinforce the strength of the solid-state electrolyte layer or to prevent short-circuits of the solid-state electrolyte.

For example, the binder included in the solid-state electrolyte layer may be styrene butadiene rubber (SBR), polytetrafluoroethylene, polyvinylidene fluoride, polyethylene, polyvinyl alcohol, or a combination thereof, but is not limited to the aforementioned materials and may be any suitable material used as a binder in the art. The binder in the solid-state electrolyte may be a binder of the same kind as the binder in the cathode layer, the anode layer, or a combination thereof, or may be a binder of a different kind therefrom.

The oxide-based solid-state electrolyte may be, for example, $Li_{1+x+y}Al_xTi_{2-x}Si_yP_{3-y}O_{12}$ ($0<x<2$ and $0\leq y\leq 3$), $BaTiO_3$, $Pb(Zr_pTi_{1-p})O_3$ (PZT, $0\leq p\leq 1$), $Pb_{1-x}La_xZr_{1-y}Ti_yO_3$ (PLZT) ($0\leq x\leq 1$ and $0\leq y\leq 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ ($0<x<2$ and $0<y<3$), $Li_xAl_yTi_z(PO_4)_3$ ($0<x<2$, $0<y<1$, and $0<z<3$), $Li_{1+x+y}(Al_pGa_{1-p})_x(Ti_qGe_{1-q})_{2-x}Si_yP_{3-y}O_{12}$ ($0\leq x\leq 1$, $0\leq y\leq 1$, $0\leq p\leq 1$, and $0\leq q\leq 1$), $Li_xLa_yTiO_3$ ($0<x<2$ and $0<y<3$), $Li_2O$, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (M=Te, Nb, or Zr, and x is an integer of 1 to 10), or a combination thereof. The solid-state electrolyte may be prepared by a sintering method. For example, the oxide-based solid-state electrolyte may be a garnet-type solid-state electrolyte of $Li_7La_3Zr_2O_{12}$ (LLZO), $Li_{3+x}La_3Zr_{2-a}M_aO_{12}$ (M doped LLZO, M=Ga, W, Nb, Ta, or Al, and x is selected from 1 to 10), or a combination thereof.

For example, the sulfide-based solid-state electrolyte may include lithium sulfide, silicon sulfide, phosphorus sulfide, boron sulfide, or a combination thereof. Sulfide-based solid-state electrolyte particles may include $Li_2S$, $P_2S_5$, $SiS_2$, $GeS_2$, $B_2S_3$, or a combination thereof. The sulfide-based solid-state electrolyte particles may be $Li_2S$ or $P_2S_5$. The sulfide-based solid-state electrolyte particles are known to have a higher lithium ion conductivity than other inorganic compounds. For example, the sulfide-based solid-state electrolyte may include $Li_2S$ and $P_2S_5$. If sulfide solid-state electrolyte materials of the solid-state electrolyte include $Li_2S$—$P_2S_5$, a molar ratio of $Li_2S$ to $P_2S_5$ may be, for example, in a range of about 50:50 to about 90:10. In addition, the sulfide-based solid-state electrolyte may include an inorganic solid-state electrolyte prepared by adding a compound such as $Li_3PO_4$, a halogen, a halogen compound, $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("ThioLISICON"), $Li_2O$—$Al_2O_3$—$TiO_2$—$P_2O_5$ ("LATP"), or a combination thereof, to an inorganic solid-state electrolyte of $Li_2S$—$P_2S_5$, $SiS_2$, $GeS_2$, $B_2S_3$, or a combination thereof. Non-limiting examples of a sulfide solid-state electrolyte material may include $Li_2S$—$P_2S_5$; $Li_2S$—$P_2S_5$—LiX (X is a halogen element); $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$—$Z_mS_n$ (m and n each are a positive number, and Z is Ge, Zn, or G); $Li_2S$—$GeS_2$; $Li_2S$—$SiS_2$—$Li_3PO_4$; $Li_2S$—$SiS_2$—$Li_pMO_q$ (in the formula, p and q each are a positive number, and M is P, Si, Ge, B, Al, Ga, or In); or a combination thereof. In this regard, the sulfide-based solid-state electrolyte material may be prepared by subjecting a starting material (e.g., $Li_2S$, or $P_2S_5$) of the sulfide-based solid-state electrolyte material to a treatment such as melt quenching, mechanical milling, or a combination thereof. In addition, a calcination process may be performed following the above treatment.

Next, a cathode may be prepared.

The cathode may be prepared by forming a cathode active material layer including a cathode active material on a cathode current collector. The cathode active material layer may be prepared by a vapor deposition method or a solid-state method. The vapor deposition method may be, but not being limited to, pulsed laser deposition (PLD), sputtering deposition, or chemical vapor deposition (CVD), for example. Any of various vapor deposition methods available in the art may be used. The solid-phase method may be, but not being limited to, sintering, a sol-gel method, a doctor blade method, screen printing, slurry casting, or powder compression, for example. Any of various solid phase methods suitable in the art may be used.

The cathode active material layer may include a cathode active material. The cathode active material and the cathode current collector may be selected from among materials for use in the lithium ion battery described above.

The cathode active material layer may further include, for example, a conducting agent, a binder, or a combination thereof. The conducting agent and the binder may be selected from among materials for use in the lithium ion battery described above.

The cathode active material layer may include the solid-state electrolyte containing the compound represented by Formula 1. A protection layer including the solid-state electrolyte containing the compound represented by Formula 1 may be disposed on the cathode active material layer.

Next, an anode may be prepared.

The anode may be prepared by the same method as the cathode except that an anode active material is used instead of a cathode active material. The anode may be prepared by forming an anode active material layer including an anode active material, on an anode current collector.

The anode active material layer may include an anode active material. The anode active material and the anode current collector may be selected from among materials for use in the lithium ion battery described above. The anode active material may be, for example, lithium metal, a lithium metal alloy, or a combination thereof.

The anode active material layer may further include, for example, a binder, a conducting agent, or a combination thereof. The conducting agent and the binder may be selected from among materials for use in the lithium ion battery described above.

The anode active material layer may include the solid-state electrolyte containing the compound represented by Formula 1. A protection layer including the solid-state electrolyte containing the compound represented by Formula 1 may be disposed on the anode active material layer.

Referring to FIG. 9, a solid-state battery 40 may include a solid-state electrolyte layer 30, a cathode 10 disposed on a first side of the solid-state electrolyte layer 30, and an anode 20 disposed on a second side of the solid-state electrolyte layer 30. The solid-state electrolyte layer 30 may include a cathode active material layer 12 in contact with the solid-state electrolyte layer 30, and a cathode current collector 11 in contact with the cathode active material layer 12. The anode 20 may include an anode active material layer 22 in contact with the solid-state electrolyte layer 30 and an anode current collector 21 in contact with the anode active material layer 22. For a solid-state secondary battery 40, for example, each of the cathode active material layer 12 and the anode active material layer 22 may be formed on each of the first side and the second side of the solid-state electrolyte layer 30, and the cathode current collector 11 and the anode current collector 21 may be formed on the cathode active material layer 12 and the anode active material layer 22, respectively, to thereby form a solid-state secondary battery 30. Alternatively, the anode active material layer 22, the solid-state electrolyte layer 30, the cathode active material layer 12, and the cathode current collector 11 may be sequentially disposed on the anode current collector 21 to thereby form the solid-state secondary battery 40.

(Type 2: Solid-State Battery Employing Precipitation-Type Anode)

Figure 10:
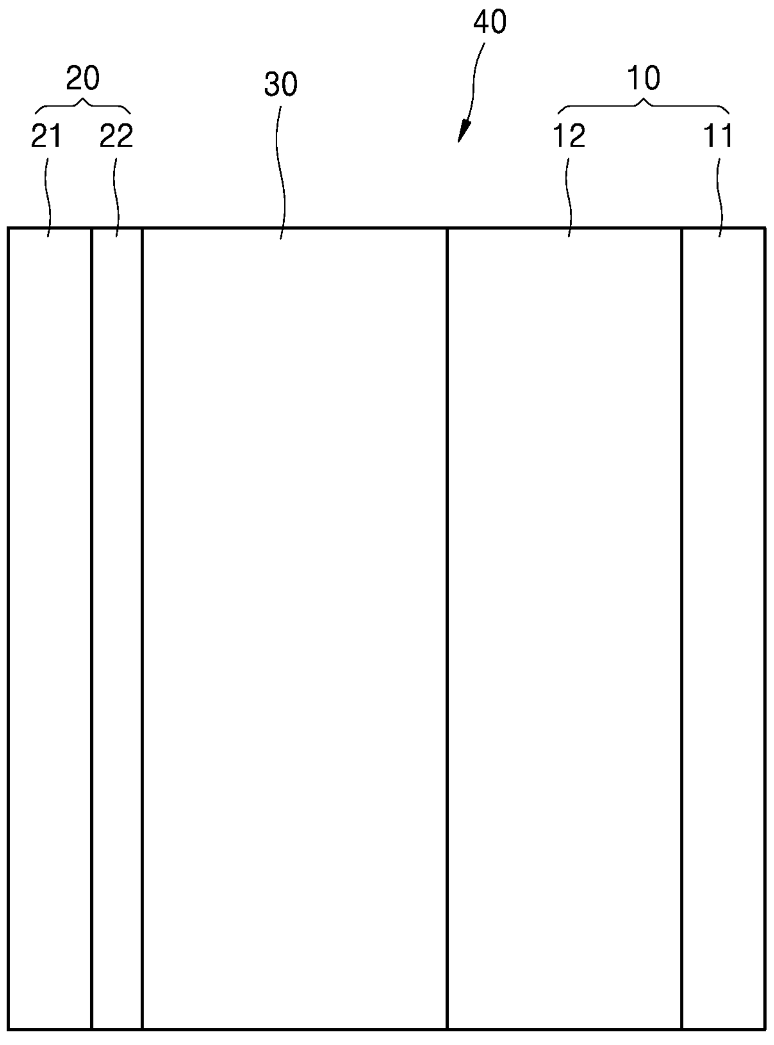
FIG. 10 is a schematic diagram of an embodiment of a structure of a solid-state battery.
Figure 11:
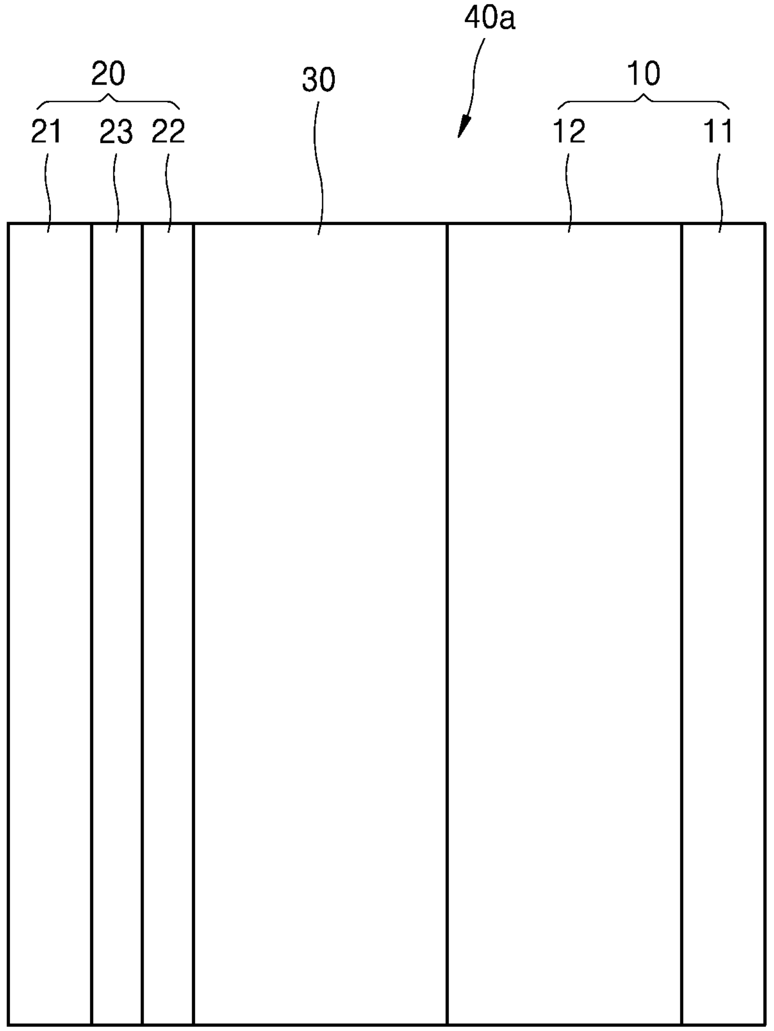
FIG. 11 is a schematic diagram of an embodiment of a structure of a solid-state battery.

FIGS. 10 to 11 are each a schematic diagram of a solid-state battery including a precipitation-type anode according to an embodiment. In the solid-state battery including the precipitation-type anode, the initial charge capacity of an anode active material layer at the beginning of the charging may be, for example, about 50% or less, about 40% or less, about 30% or less, about 20% or less, about 10% or less, about 5% or less, or about 1% or less, relative to the initial charge capacity of a cathode active material layer. For example, the solid-state secondary battery 40 may include a cathode layer 10 including a cathode active material layer 12 disposed on a cathode current collector 11; an anode layer 20 including an anode active material layer 22 disposed on an anode current collector 21; and an electrolyte layer 30 disposed between the cathode layer 10 and the anode layer 20, wherein the cathode active material layer 12 and/or the solid-state electrolyte layer 30 may include a solid-state electrolyte.

A solid-state battery according to another embodiment may be prepared as follows.

The cathode and the solid-state electrolyte layer may be prepared following the same process as the solid-state secondary battery including the non-precipitation type anode described above.

Next, an anode may be prepared.

Referring to FIGS. 10 to 11, an anode 20 may include an anode current collector 21 and an anode active material layer 22 disposed on the anode current collector 21. For example, the anode active material layer 22 may include an anode active material and a binder.

The anode active material included in the anode active material layer 22 may have, for example, a particle shape. The anode active material having a particle shape may have a median particle diameter of, for example, about 4 μm or less, about 3 μm or less, about 2 μm or less, about 1 μm or less, or about 900 nanometers (nm) or less. The median particle diameter of the anode active material having a particle shape may be, for example, from about 10 nm to about 4 μm, about 10 nm to about 3 μm, about 10 nm to about 2 μm, about 10 nm to about 1 μm, or about 10 nm to about 900 nm. When the median particle diameter of the anode active material is in the above ranges, reversible absorbing and/or desorbing of lithium may take place more easily during charging/discharging. The median particle diameter of the anode active material may be, for example, a median particle diameter (D50) as measured using a laser-type particle size distribution analyzer.

The anode active material included in the anode active material layer 22 may include, for example, a carbonaceous anode active material, a metal or metalloid anode active material, or a combination thereof.

The carbonaceous anode active material may be, in particular, an amorphous carbon. The amorphous carbon may be, for example, carbon black (CB), acetylene black (AB), furnace black (FB), Ketjen black (KB), or graphene, but is not necessarily limited thereto. The amorphous carbon may be any suitable material classified as amorphous carbon in the art. Amorphous carbon is carbon that has no crystalline structure or has an extremely low degree of crystallinity, and as such, is distinguished from crystalline carbon or graphitic carbon.

The metal or metalloid anode active material may include gold (Au), platinum (Pt), palladium (Pd), silicon (Si), silver (Ag), aluminum (Al), bismuth (Bi), tin (Sn), zinc (Zn), or a combination thereof, but is not necessarily limited to the aforementioned materials. The metal or metalloid anode active material may be any suitable metal anode active material or metalloid anode active material in the art that is capable of forming an alloy or a compound with lithium. For example, nickel (Ni) does not form an alloy with lithium and therefore, is not a metal anode active material.

The anode active material layer 22 may include a single type of such anode active materials, or may include a mixture of anode active materials of multiple different types. For example, the anode active material layer 22 may include only amorphous carbon as the anode active material, or may include gold (Au), platinum (Pt), palladium (Pd), silicon (Si), silver (Ag), aluminum (Al), bismuth (Bi), tin (Sn), zinc (Zn), or a combination thereof. Alternatively, the anode active material layer 22 may include a mixture of amorphous carbon with gold (Au), platinum (Pt), palladium (Pd), silicon (Si), silver (Ag), aluminum (Al), bismuth (Bi), tin (Sn), zinc (Zn), or a combination thereof. A ratio by weight of the mixture of amorphous carbon with a metal, such as gold, may be about 10:1 to about 1:2, about 5:1 to about 1:1, or about 4:1 to about 2:1, but is not necessarily limited thereto. The ratio may be selected according to a desired feature of the solid-state battery 40. As the anode active material has such a composition, cycle characteristics of the solid-state battery 40 may be further improved.

The anode active material included in the anode active material layer 22 may include, for example, a mixture of first particles composed of amorphous carbon, and second particles composed of a metal or metalloid. Examples of the metal or metalloid may include gold (Au), platinum (Pt), palladium (Pd), silicon (Si), silver (Ag), aluminum (Al), bismuth (Bi), tin (Sn), zinc (Zn), or a combination thereof. In some cases, the metalloid may be a semiconductor. The content of the second particles may be about 8 wt % to about 60 wt %, about 10 wt % to about 50 wt %, about 15 wt % to about 40 wt %, or about 20 wt % to about 30 wt %, relative to a total weight of the mixture. As the content of the second particles is in the above ranges, cycle characteristics, for example, of the solid-state battery 40 may be further improved.

The binder included in the anode active material layer 22 may be, for example, styrene butadiene rubber (SBR), polytetrafluoroethylene, polyvinylidene fluoride, polyethylene, a vinylidene fluoride/hexafluoropropylene copolymer, polyacrylonitrile, polymethylmethacrylate, or a combination thereof, but is not necessarily limited to the aforementioned materials. The binder may be any suitable material available as a binder in the art. The binder may be composed of a single type of binder, or multiple binders of different types.

As the anode active material layer 22 contains a binder, the anode active material layer 22 may be stabilized on the anode current collector 21. In addition, cracking in the anode active material layer 22 may be inhibited despite volume changes and/or displacements of the anode active material layer 22 during charging/discharging. For example, when the anode active material layer 22 does not contain any binder, this may cause the anode active material layer 22 to easily separate from the anode current collector 21. The likelihood of short circuits may be increased as the anode current collector 21 comes in contact with the solid-state electrolyte layer 30 at an exposed part of the anode current collector 21 formed as the anode current collector 21 has separated from the anode current collector 21. For example, a slurry containing materials of the anode active material layer 22 dispersed therein may be applied on the anode current collector 21, and the coated anode current collector 21 may be dried to produce the anode active material layer 22. By including a binder in the anode active material layer 22, stable dispersion of the anode active materials within the slurry may be achieved. For example, when the slurry is applied onto the anode current collector 21 by a screen printing technique, clogging of a screen (for example, clogging by aggregates of the anode active materials) may be prevented.

The anode active material layer 22 may further include an additive for use in the conventional solid-state battery 40, such as a filler, a coating agent, a dispersing agent, an ion-conducting aid, or a combination thereof.

A thickness of the anode active material layer 22 may be, for example, about 50% or less, about 40% or less, about 30% or less, about 20% or less, about 10% or less, or about 5% or less, relative to a thickness of the cathode active material layer 12. A thickness of the anode active material layer 22 may be, for example, from about 1 μm to about 20 μm, about 2 μm to about 10 μm, or about 3 μm to about 7 μm. When the anode active material layer 22 has an excessively small thickness, lithium dendrites formed between the anode active material layer 22 and the anode current collector 21 may disintegrate the anode active material layer 22, thus making it difficult to improve cycle characteristics of the solid-state battery 40. When the anode active material layer 22 has an excessively large thickness, it may cause a decrease in energy density of the solid-state battery 40 and increase in internal resistance of the solid-state battery 40 by the anode active material layer 22, thus making it difficult to improve cycle characteristics of the solid-state battery 40.

As the thickness of the anode active material layer 22 is decreased, for example, the charging capacity of the anode active material layer 22 may also decrease. The charging capacity of the anode active material layer 22 may be, for example, about 50% or less, about 40% or less, about 30% or less, about 20% or less, about 10% or less, about 5% or less, about 2% or less, or about 1% or less, relative to the charging capacity of a cathode active material layer 12. The charging capacity of the anode active material layer 22 may be, for example, about 0.1% to about 50%, about 0.1% to about 40%, about 0.1% to about 30%, about 0.1% to about 20%, about 0.1% to about 10%, about 0.1% to about 5%, or about 0.1% to about 2%, relative to the charging capacity of the cathode active material layer 12. When the anode active material layer 22 has an excessively small charging capacity, the thickness of the anode active material layer 22 becomes extremely small, and therefore, during repeated charging/discharging processes, lithium dendrites formed between the anode active material layer 22 and the anode current collector 21 may disintegrate the anode active material layer 22 and thus make it difficult to improve cycle characteristics of the solid-state battery 40. When the anode active material layer 22 has an excessively large charge capacity, it may cause a decrease in energy density of the solid-state battery 40 and increase in internal resistance of the solid-state battery 40 by the anode active material layer 22, thus making it difficult to improve cycle characteristics of the solid-state battery 40.

Here, the charging capacity of the cathode active material layer 12 may be obtained by multiplying the charging specific capacity (milliampere-hours per gram, mAh/g) of the cathode active material by the mass of the cathode active material in the cathode active material layer 12. When a plurality of cathode active materials are used, the multiplication value of the charging specific capacity and the mass of each of the cathode active materials is calculated, and the sum of the multiplication values may be defined as the charging capacity of the cathode active material layer 12. A charging capacity of the anode active material layer 22 may be obtained by the same method as described herein with respect to the cathode active material layer 12. Here, the charging capacity of the anode active material layer 22 may be obtained by multiplying the charging specific capacity (mAh/g) of the anode active material by the mass of the anode active material in the anode active material layer 22. When more than one kind of anode active materials are used, the multiplication value of the charging specific capacity and mass of each of the anode active materials is calculated, and the sum of the multiplication values may be defined as the charging capacity of the anode active material layer 22. Here, the charging specific capacities of the cathode and anode active materials are capacities estimated using solid-state half cells using a lithium metal as a counter electrode. The charging capacities of the cathode active material layer 12 and the anode active material layer 22 may be directly measured with the solid-state half cells. The charging capacity thus measured may be divided by the mass of each active material, thereby obtaining the charging specific capacity. In addition, the charging capacity of the cathode active material layer 12 and the anode active material layer 22 may be an initial charging capacity measured at the time of first cycle charging.

Referring to FIG. 11, a solid-state battery 40*a* may further include, for example, a metal layer 23 disposed between an anode current collector 21 and an anode active material layer 22. The metal layer 23 may be a metal foil or a plated metal layer. The metal layer 23 may include lithium or a lithium alloy. Thus, the metal layer 23 may act as a lithium reservoir, for example. The lithium alloy may include, for example, Li—Al alloy, Li—Sn alloy, Li—In alloy, Li—Ag alloy, Li—Au alloy, Li—Zn alloy, Li—Ge alloy, Li—Si alloy, or a combination thereof, but is not limited thereto and may be any suitable material available as a lithium alloy in the art. The metal layer 23 may be composed of one of such alloys or lithium, or may be composed of alloys of various types.

A thickness of the metal layer 23 is not particularly limited, but may be, for example, about 1 μm to about 200 μm, about 1 μm to about 100 μm, about 1 μm to about 70 μm, about 1 μm to about 50 μm, about 1 μm to about 30 μm, or about 1 μm to about 20 μm. If the thickness of the metal layer 23 is too small, it may be difficult for the metal layer 23 to act as a lithium reservoir. If the thickness of the metal layer 23 is too large, the mass and volume of the solid-state battery 40 may increase, and cycle characteristics thereof may rather deteriorate. The metal layer 23 may be, for example, a metal foil having a thickness in such ranges.

In the solid-state battery 40*a*, the metal layer 23 may be positioned, for example, between the anode current collector 21 and the anode active material layer 22 prior to assembly of the solid-state battery 40*a*, or may be precipitated between the anode current collector 21 and the anode active material layer 22 by charging after assembly of the solid-state battery 40*a*. In a case in which the metal layer 23 is positioned between the anode current collector 21 and the anode active material layer 22 prior to assembly of the solid-state battery 40*a*, the metal layer 23 is a metal layer containing lithium, and therefore acts as a lithium reservoir. For example, prior to assembly of the solid-state battery 40*a*, a lithium foil may be positioned between the anode current collector 21 and the anode active material layer 22. As a result, the solid-state battery 40*a* having the metal layer 23 may have further improved cycle characteristics. In a case in which the metal layer 23 is precipitated by charging after assembly of the solid-state battery 1*a*, since the metal layer 23 is not included at the time of assembly of the solid-state battery 40*a*, and as a result, energy density of the solid-state battery 40*a* increases. For example, when charging the solid-state battery 40*a*, the solid-state battery 40*a* is charged to exceed the charging capacity of the anode active material layer 22. That is, the anode active material layer 22 is overcharged. At the beginning of the charging, lithium is absorbed into the anode active material layer 22. That is, the anode active material included in the anode active material layer 22 may form an alloy or compound with lithium ions migrated from the cathode layer 10. If charging is performed to exceed the capacity of the anode active material layer 22, lithium may be precipitated, for example, on the back of the anode active material layer 22, that is, between the anode current collector 21 and the anode active material layer 22, and a metal layer that corresponds to the metal layer 23 may be formed by the precipitated lithium. The metal layer 23 may be a metal layer mainly composed of lithium (i.e., metal lithium). This result is attributable to the fact that the anode active material included in the anode active material layer 22 is composed of a material that forms an alloy or compound with lithium. During discharge, lithium in the anode active material layer 22 and the metal layer 23, that is, in metal layers, may be ionized and migrate toward the cathode layer 10. Accordingly, in the solid-state battery 40*a*, lithium may be used as the anode active material. In addition, since the metal layer 23 is covered by the anode active material layer 22, the anode active material layer 22 may function as a protective layer of the metal layer 23 while inhibiting precipitation and growth of lithium dendrites. Accordingly, short circuit and capacity fading in the solid-state battery 40*a* may be efficiently inhibited, and as a result, cycle characteristics of the solid-state battery 40*a* may be improved. In addition, if the metal layer 23 is to be disposed by charging after assembly of the solid-state battery 40*a*, the anode current collector 21, the anode active material layer 22, and the area therebetween may be Li-free regions not containing lithium, for example, in an initial state or discharged state of the solid-state battery 40*a*.

The anode current collector 21 may be composed of a material that does not react with lithium, for example, a material that does not form an alloy or a compound with lithium. The material forming the anode current collector 21 may be, for example, copper (Cu), stainless steel, titanium (Ti), iron (Fe), cobalt (Co), nickel (Ni), or a combination thereof, but is not necessarily limited thereto and may be any suitable material available as an electrode current collector in the art. The anode current collector 21 may be composed of one of the aforementioned metals or an alloy of two or more metals, or a coating material. The anode current collector 21 may be, for example, a plate shape or a foil shape.

The solid-state battery 40, 40*a* may further include, for example, a thin film (not illustrated) containing an element alloyable with lithium on the anode current collector 21. The thin film may be positioned between the anode current collector 21 and the anode active material layer 22. The thin film may include, for example, an element capable of forming an alloy with lithium. Examples of the element alloyable with lithium may include, but are not limited to, gold (Au), silver (Ag), zinc (Zn), tin (Sn), indium (In), silicon (Si), aluminum (Al), bismuth (Bi) or a combination thereof, and may be any suitable element that can form an alloy with lithium in the art. The thin film may be composed of one of the aforementioned metals or may be composed of an alloy of various kinds of metals. When the thin film is disposed on the anode current collector 21, for example, the metal layer 23 being precipitated between a thin film and the anode active material layer 22 may have a further flattened precipitation form, and cycle characteristics of the solid-state battery 40, 40*a* may be further improved.

A thickness of the thin film may be, for example, from about 1 nm to about 800 nm, about 10 nm to about 700 nm, about 50 nm to about 600 nm, or about 100 nm to about 500 nm. If the thickness of the thin film is less than 1 nm, it may be difficult to achieve the function as a thin film. If the thickness of the thin film is excessively large, the thin film absorbs lithium into itself, causing a decrease in the precipitation amount of lithium at the anode, and this may cause the energy density of the solid-state battery to deteriorate and cycle characteristics of the solid-state battery 40, 40*a* to deteriorate. The thin film may be positioned on the anode current collectors 21 by a vacuum deposition method, a sputtering method, or a plating method, but is not limited to the aforementioned methods and may be any suitable method available in the art that is capable of forming a thin film.

(Multilayer Ceramic (MLC) Battery)

A multilayer ceramic battery may include, for example, a plurality of cathode layers; a plurality of anode layers alternately disposed between the plurality of cathode layers; and a plurality of solid-state electrolyte layers alternately disposed between the plurality of cathode layers and the plurality of anode layers. The solid-state electrolyte included in the multilayer ceramic battery may be, for example, an oxide-based solid-state electrolyte. The solid-state electrolyte may include, for example, the solid-state electrolyte containing the compound represented by Formula 1.

A MLC battery may be, for example, a sintered product of a laminate in which a cathode active material precursor, an anode active material precursor, and a solid-state electrolyte precursor are sequentially disposed (e.g., deposited), or a sintered product of a laminate in which a cathode active material, an anode active material, and a solid-state electrolyte are sequentially deposited. For example, the MLC battery may be provided with a laminate structure in which a plurality of unit cells is deposited so that a cathode active material layer and an anode active material layer face each other, the unit cell including a cathode layer including a cathode active material layer; a solid-state electrolyte layer; and an anode layer are sequentially and continuously deposited. The MLC battery may further include, for example, a cathode current collector and/or an anode current collector. In a case in which the MLC battery includes a cathode current collector, a cathode active material layer may be disposed on both sides of the cathode current collector. In a case in which the MLC battery includes an anode current collector, an anode active material layer may be disposed on both sides of the anode current collector. As the MLC battery further includes a cathode current collector and/or an anode current collector, high-rate characteristics of the battery may be further improved. In the MLC battery, the unit cell may be laminated by providing a current collector layer on the uppermost layer or the lowermost layer, or both, of the laminate, or by placing a metal layer in the laminate. An MLC battery or a thin-film battery is a compact or extremely small battery that can be applied as a power source for Internet-of-Things (IoT) applications and wearable devices. An MLC battery or a thin film battery can also be applied to medium- or large-sized batteries such as electric vehicles (EVs) and energy storage systems (ESSs).

The anode included in the MLC battery may include, for example, at least one anode active material of lithium metal phosphates, lithium metal oxides, metal oxides, or a combination thereof. The anode active material may be, for example, a compound of $Li_{4/3}Ti_{5/3}O_4$, $LiTiO_2$, $LiM1_sM2_tO_u$ (M1 and M2 each are a transition metal, and s, t, and u each are any positive number), $TiO_x$ ($0<x\leq3$), $Li_xV_2(PO_4)_3$ ($0<x\leq5$), or a combination thereof. The anode active material may be, in particular, $Li_{4/3}Ti_{5/3}O_4$, $LiTiO_2$, or a combination thereof.

The cathode included in an MLC battery may include a cathode active material. The cathode active material may be selected from among cathode active materials for use in a lithium ion battery. The cathode active material may include, for example, lithium metal phosphates, lithium metal oxides, or a combination thereof. The cathode active material may include, for example, lithium cobalt oxide, lithium iron phosphate, lithium nickel cobalt manganese oxide, lithium nickel cobalt aluminum oxide, lithium nickel cobalt manganese aluminum oxide, or a combination thereof.

A current collector layer may function as a cathode current collector and/or an anode current collector. The current collector layer may be made of, for example, any metal among Ni, Cu, Ag, Pd, Au, Pt, or a combination thereof. The current collector layer may be made of, for example, an alloy containing Ni, Cu, Ag, Pd, Au, Pt, or a combination thereof. The alloy may be, for example, an alloy of two or more of Ni, Cu, Ag, Pd, Au, or Pt. The alloy may be, for example, an Ag/Pd alloy. Such a metal and alloy may be a single type or a mixture of two or more types. The current collector layer as a cathode current collector and the current collector layer as an anode current collector may utilize the same material or a different material from each other. An alloy or mixture powder containing Pd and Ag, depending on their mixing ratio, can vary the melting point in a continuous manner from the melting point of silver (962° C.) to the melting point of palladium (1550° C.), and thus may enable a melting point adjustment to a batch sintering temperature and due to high electrical conductivity, may inhibit an increase of internal resistance in the battery.

The solid-state electrolyte may be, for example, an oxide-based solid-state electrolyte. The oxide-based solid-state electrolyte may be selected from among materials for use in the solid-state battery described above. For example, the solid-state electrolyte may be a lithium compound of $Li_{3.25}Al_{0.25}SiO_4$, $Li_3PO_4$, $LiP_xSi_yO_z$ (in the formula, x, y, and z each are any positive number), or a combination thereof. The solid-state electrolyte may be, for example, $Li_{3.5}P_{0.5}Si_{0.5}O_4$.

Figure 12:
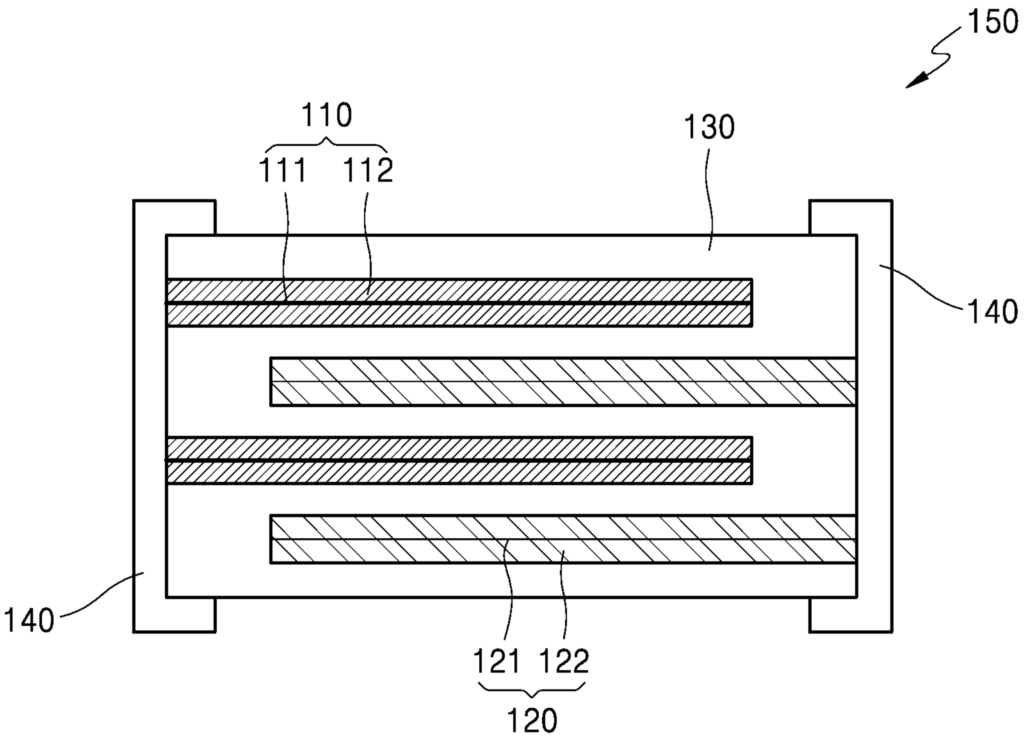
FIG. 12 is a schematic diagram of an embodiment of a structure of a multilayer ceramic battery.

FIG. 12 is a schematic cross-sectional view of a multilayer ceramic (MLC) battery according to an embodiment. Referring to FIG. 12, a cathode active material layer 112 may be disposed on both sides of a cathode current collector 111 to form a cathode 110. An anode electrode 120 may be formed by depositing an anode active material layer 122 on both sides of an anode current collector 121. A solid-state electrolyte 130 may be disposed between the cathode 110 and the anode 120. An external electrode 140 may be formed at both ends of a battery body 150. The external electrode 140 may be connected to the cathode 110 and the anode 120, each of which tip portion is exposed outside the battery body 150, to act as an external terminal that electrically connects the cathode 110 and the anode 120 to an external element. One of a pair of external electrodes 140 may have one end thereof connected to the cathode 110 exposed to the outside of the battery body 150, and the other one of the pair of the external electrodes 140 may have the other end thereof connected to the anode 120 exposed to the outside of the battery body 150. A multilayer ceramic (MLC) battery 150 may be produced by sequentially depositing an oxide electrode and a solid-state electrolyte and then, heat-treating the oxide electrode and the solid-state electrolyte simultaneously.

Figure 13:
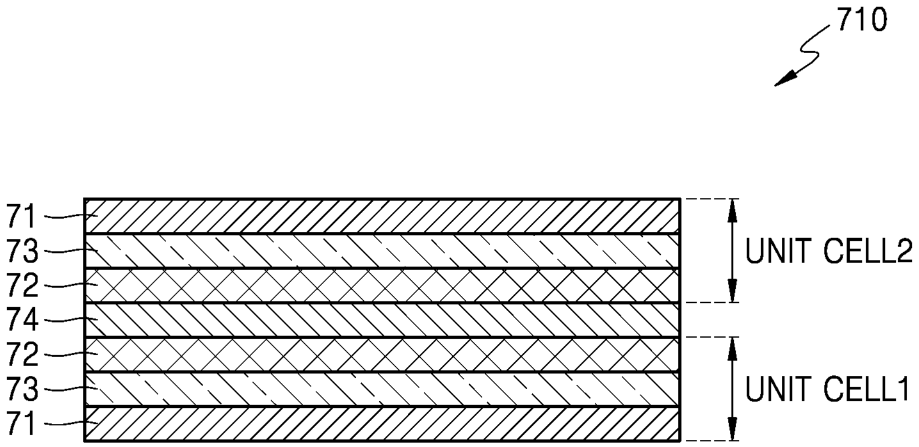
FIG. 13 is a schematic diagram of an embodiment of a structure of a multilayer ceramic battery.
Figure 14:
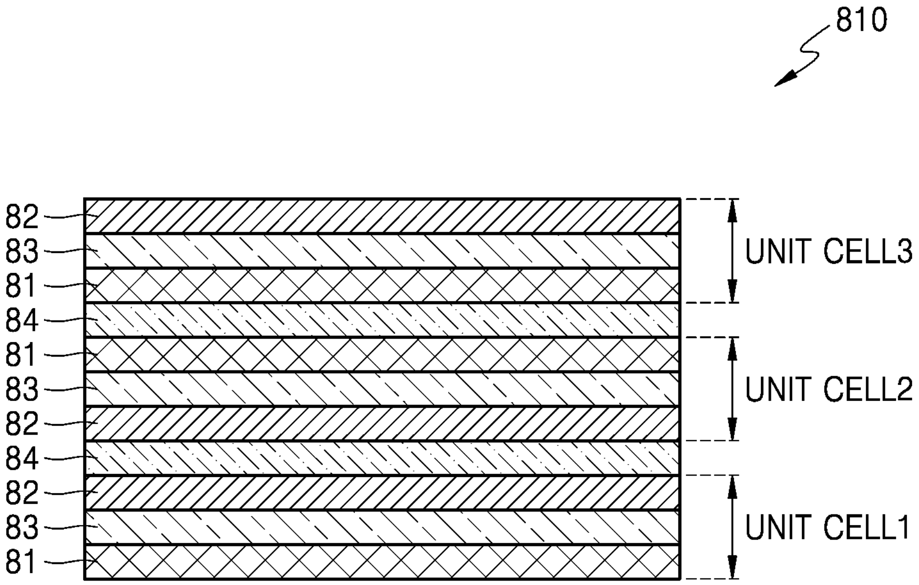
FIG. 14 is a schematic diagram of an embodiment of a structure of a multilayer ceramic battery.

FIGS. 13 and 14 schematically show a cross-sectional structure of a multilayer ceramic battery according to another embodiment. As shown in FIG. 13, in the multilayer ceramic battery 710, a unit cell 1 and a unit cell 2 may be deposited through an internal current collector layer 74. Each of the unit cell 1 and the unit cell 2 may be composed of a cathode layer 71, a solid-state electrolyte layer 73, and an anode layer 72, sequentially stacked. The unit cell 1 and the unit cell 2 may be laminated with the internal current collector layer 74 such that the anode layer 72 of the unit cell 2 is adjacent to a first surface (top surface in FIG. 13) of the internal current collector layer 74, and the anode layer 72 of the unit cell 1 is adjacent to a second surface (bottom surface in FIG. 13) of the internal current collector layer 74. Although in FIG. 13, the internal current collector layer 74 is illustrated as being disposed in contact with the anode layer 72 of each of the unit cell 1 and the unit cell 2, the internal current collector layer 74 may be disposed to be in contact with the cathode layer 71 of each of the unit cell 1 and the unit cell 2. The inner current collector layer 74 may include an electronically conductive material. The inner current collector layer 74 may further include an ionic conductive material. Further inclusion of an ionic conductive material may improve voltage stabilization characteristics. Since both the first surface and the second surface of the internal current collector layer 74 in a multilayer ceramic battery 710 show the same polarity, it is possible to obtain a monopolar-type multilayer ceramic battery 710 in which a plurality of unit cells is connected in parallel by inserting the internal current collector layer 74. As a result, a high-capacity type multilayer ceramic battery 710 may be obtained. Since in the multilayer ceramic battery 710, the internal current collector layer 74 placed between the unit cell 1 and the unit cell 2 includes an electronical conductive material, two adjacent unit cells may be electrically connected in parallel and at the same time, between two adjacent unit cells, the cathode layer 71 or the anode layer 72 may be connected in an ionically conductive manner.

Accordingly, as an electric potential of adjacent cathode layer 71 or anode layer 72 may be equalized through the internal current collector layer 74, and a stable output voltage may be obtained. In addition, it is possible to remove external current collecting members such as tabs, and electrically connect in parallel unit cells of the multilayer ceramic battery 710. Through such a configuration, the multilayer ceramic battery 710 having excellent space utilization and cost-effectiveness may be obtained. Referring to FIG. 14, the laminate may contain a cathode layer 81, an anode layer 82, a solid-state electrolyte layer 83, and an internal current collector layer 84. A multilayer ceramic battery laminate 810 may be obtained by lamination and thermal compression of such a laminate. The cathode layer 81 may be composed of a single sheet of a cathode layer sheet, and the anode layer 82 may be composed of two sheets of an anode layer sheet.

Method of Preparing Solid-State Electrolyte

A method of preparing a solid-state electrolyte comprising a compound represented by Formula 1 according to another embodiment includes providing (e.g., preparing) a first material comprising a crystalline $Li_5AlO_4$ and a lithium compound comprising a crystalline LiX, wherein X is Cl, Br, or a combination thereof; and mechanochemically contacting the first material and the lithium compound to prepare the amorphous compound represented by Formula 1.

$$Li_{5-4y}Al_{1-y}X_yO_{4-4y-\delta} \quad \text{Formula 1}$$

In Formula 1, $0.1 \le y \le 0.8$ and $0 \le \delta < 1$, and X is Cl, Br, or a combination thereof.

The first material may be crystalline $Li_5AlO_4$ powder, for example. The lithium compound may be crystalline LiX powder, for example. LiX may be LiCl, LiBr or a mixture thereof.

Use of the crystalline $Li_5AlO_4$ and the crystalline LiX may facilitate a formation of the amorphous solid-state electrolyte containing the compound represented by Formula 1.

For example, the first material and the lithium compound may be mixed in a molar ratio of about 9:1 to about 2:8, about 8:2 to about 2:8, about 8:2 to about 3:7, about 7:3 to about 3:7, or about 6:4 to about 3:7. As the first material and the lithium compound are mixed in the above ranges, ionic conductivity of the solid-state electrolyte may be further improved.

For example, the mechanochemically contacting may comprise mechanical milling to initiate a mechanochemical reaction. The mechanical milling may be a ball mill, or a jet mill, but is not limited thereto and may be any suitable method capable of initiating the mechanochemical reaction in the art. For example, the mechanical milling may be conducted by a dry method in an inert atmosphere for about 10 hours to 1,000 hours, about 10 hours to 100 hours, or 10 hours to 30 hours. For example, the mechanical milling may be conducted by a dry method in an inert atmosphere at a speed of about 300 rotations per minute (rpm) to about 10,000 rpm, about 350 rpm to about 5,000 rpm, or about 370 rpm to about 1000 rpm. The inert atmosphere may be an atmosphere substantially free of oxygen. For example, the inert atmosphere may be an atmosphere containing nitrogen, argon, neon, or a combination thereof. The mechanochemical reaction may be, for example, an exothermic reaction. A reaction that the amorphous $Li_5AlO_4$ and the crystalline LiX react with each other to produce the amorphous solid-state electrolyte represented by Formula 1 may be an exothermic reaction. A temperature of the exothermic reaction may be, for example, about 100° C. to about 500° C., about 100° C. to about 400° C., about 100° C. to about 300° C., or about 100° C. to about 200° C. Mechanical milling may be performed, for example, by a dry method without using solvents. As the mechanical milling is performed by a dry method, post-treatment processes such as solvent removal, may be omitted.

The preparation of the solid-state electrolyte may be performed without additional heating. In the preparation of the solid-state electrolyte, processes such as applying external thermal energy, such as an additional heat-treatment, may not be conducted. By not including an additional heat-treatment, the production of the solid-state electrolyte containing the compound represented by Formula 1 may be more convenient and inexpensive.

The mechanochemical reaction of the first material and the lithium compound may include preparing a second material by amorphization of the first material; and preparing the electrolyte by the mechanochemical reaction of the second material with the lithium compound.

In the preparation of the second material by amorphization of the first material compound, the amorphization may be carried out by a mechanochemical reaction. The mechanochemical reaction may be carried out by any suitable method capable of conducting amorphization. For example, the mechanochemical reaction may be carried out by mechanical milling. The mechanochemical milling may be performed under conditions having the same ranges as the electrolyte preparation process described above. The second material may include the amorphous $Li_5AlO_4$. Use of the amorphous $Li_5AlO_4$ and the crystalline LiX may facilitate more effective formation of the amorphous solid-state electrolyte containing the compound represented by Formula 1. By preparing the amorphous $Li_5AlO_4$ by mechanical milling, the amorphous solid-state electrolyte containing the compound represented by Formula 1 may have further improved ionic conductivity.

Hereinbelow, the present disclosure will be described in greater detail in conjunction with Examples and Comparative Examples, but is not limited to the examples disclosed below.

EXAMPLES

Preparation of Electrolyte

Example 1

A crystalline $Li_5AlO_4$ and a crystalline LiCl were placed in a ball mill in a molar ratio of 9:1 and dry-milled at 700 rpm for 18 hours under an inert atmosphere, to produce an amorphous solid-state electrolyte, $Li_{4.6}Al_{0.9}Cl_{0.1}O_{3.6}$.

During the milling process, the temperature inside the ball mill reactor was 100° C. or greater. The solid-state electrolyte was a powder.

Example 2

An amorphous solid-state electrolyte, $Li_{3.8}Al_{0.7}Cl_{0.3}O_{2.8}$, was prepared following the same process as Example 1, except that the molar ratio of the crystalline $Li_5AlO_4$ to the crystalline LiCl was modified to 7:3.

Example 3

An amorphous solid-state electrolyte, $Li_{3.0}Al_{0.5}Cl_{0.5}O_{2.0}$, was prepared following the same process as Example 1, except that the molar ratio of the crystalline $Li_5AlO_4$ to the crystalline LiCl was modified to 5:5.

Example 4

An amorphous solid-state electrolyte, $Li_{2.6}Al_{0.4}Cl_{0.6}O_{1.6}$, was prepared following the same process as Example 1, except that the molar ratio of the crystalline $Li_5AlO_4$ to the crystalline LiCl was modified to 4:6.

Example 5

An amorphous solid-state electrolyte, $Li_{2.2}Al_{0.3}Cl_{0.7}O_{1.2}$, was prepared following the same process as Example 1, except that the molar ratio of the crystalline $Li_5AlO_4$ to the crystalline LiCl was modified to 3:7.

Example 6

An amorphous solid-state electrolyte, $Li_{1.8}Al_{0.2}Cl_{0.8}O_{0.8}$, was prepared following the same process as Example 1, except that the molar ratio of the crystalline $Li_5AlO_4$ to the crystalline LiCl was modified to 2:8.

Example 7

An amorphous solid-state electrolyte, $Li_{3.0}Al_{0.5}Cl_{0.25}Br_{0.25}O_{2.0}$, was prepared following the same process as Example 3, except that the crystalline LiCl was changed to a mixture of crystalline LiCl and crystalline LiBr in a molar ratio of 1:1.

Example 8

An amorphous solid-state electrolyte, $Li_{3.0}Al_{0.5}Br_{0.5}O_{2.0}$, was prepared following the same process as Example 3, except a crystalline LiBr was used instead of the crystalline LiCl.

Example 9

An amorphous solid-state electrolyte, $Li_{3.4}Al_{0.6}Cl_{0.4}O_{2.4}$, was prepared following the same process as Example 1, except that the molar ratio of the crystalline $Li_5AlO_4$ to the crystalline LiCl was modified to 6:4.

Comparative Example 1

The crystalline $Li_5AlO_4$ was used as is.

Comparative Example 2

An amorphous $Li_5AlO_4$ was prepared by placing the crystalline $Li_5AlO_4$ into a ball mill and performing dry milling in an inert atmosphere for 18 hours.

Comparative Example 3

Crystalline LiCl was placed into a ball mill and dry milled for 18 hours in an inert atmosphere. The milled LiCl was still crystalline. The milled crystalline LiCl was prepared.

Comparative Example 4

An amorphous solid-state electrolyte, $Li_{1.4}Al_{0.1}Cl_{0.9}O_{0.4}$, was prepared following the same process as Example 1, except that the molar ratio of the crystalline $Li_5AlO_4$ to the crystalline LiCl was modified to 1:9.

Comparative Example 5

A mixture containing the crystalline $Li_5AlO_4$ and a crystalline LiI in a molar ratio of 5:5 was sealed in a quartz glass tube and heated at 550° C. for 5 hours. Subsequently, the resulting product was pulverized to produce a solid-state electrolyte powder.

The produced solid-state electrolyte powder was crystalline $Li_{3.0}Al_{0.5}I_{0.5}O_{2.0}$.

Reference Example 1

Precursor $Li_2O$, $Al_2O_3$, and LiCl were placed in a ball mill in a molar ratio of 2.5:0.5:1 and dry-milled for 18 hours in an inert atmosphere. An amorphous solid-state electrolyte, $Li_{3.0}Al_{0.5}Cl_{0.5}O_{2.0}$, was prepared.

The crystal structures and compositions of the solid-state electrolytes prepared in Examples 1 to 8, Comparative Examples 1 to 5, and Reference Example 1 are shown in Table 1 below.

TABLE 1

| Example | Structure | Composition |
|---|---|---|
| Example 1 | Amorphous | $Li_{4.6}Al_{0.9}Cl_{0.1}O_{3.6}$ |
| Example 2 | Amorphous | $Li_{3.8}Al_{0.7}Cl_{0.3}O_{2.8}$ |
| Example 3 | Amorphous | $Li_{3.0}Al_{0.5}Cl_{0.5}O_{2.0}$ |
| Example 4 | Amorphous | $Li_{2.6}Al_{0.4}Cl_{0.6}O_{1.6}$ |
| Example 5 | Amorphous | $Li_{2.2}Al_{0.3}Cl_{0.7}O_{1.2}$ |
| Example 6 | Amorphous | $Li_{1.8}Al_{0.2}Cl_{0.8}O_{0.8}$ |
| Example 7 | Amorphous | $Li_{3.0}Al_{0.5}Cl_{0.25}Br_{0.25}O_{2.0}$ |
| Example 8 | Amorphous | $Li_{3.0}Al_{0.5}Br_{0.5}O_{2.0}$ |
| Example 9 | Amorphous | $Li_{3.4}Al_{0.6}Cl_{0.4}O_{2.4}$ |
| Comparative Example 1 | Crystalline | $Li_5AlO_4$ |
| Comparative Example 2 | Amorphous | $Li_5AlO_4$ |
| Comparative Example 3 | Crystalline | LiCl |
| Comparative Example 4 | Amorphous | $Li_{1.4}Al_{0.1}Cl_{0.9}O_{0.4}$ |
| Comparative Example 5 | Crystalline | $Li_{3.0}Al_{0.5}I_{0.5}O_{2.0}$ |
| Reference Example 1 | Amorphous | $Li_{3.0}Al_{0.5}Cl_{0.5}O_{2.0}$ |

Evaluation Example 1: X-Ray Diffraction Analysis

XRD spectra were obtained for the electrolytes prepared in Examples 1 to 8, Comparative Examples 1 to 5, and Reference Example 1, and some of the results thereof are shown in FIG. 1.

The XRD spectra were obtained using X'pert pro (PANalytical) using Cu Kα radiation (1.54056 Å).

XRD spectra of the crystalline $Li_5AlO_4$ of Comparative Example 1, the amorphous $Li_5AlO_4$ of Comparative Example 2, and the amorphous solid-state electrolyte, $Li_{3.0}Al_{0.5}Cl_{0.5}O_{2.0}$, prepared in Example 3 are shown.

As shown in FIG. 1, the crystalline $Li_5AlO_4$ of Comparative Example 1 clearly shows characteristic peaks such as a first peak at a diffraction angle of 47.0±1.0°2θ, a second peak at a diffraction angle of 35.0±1.0°2θ, and a third peak at diffraction angle of 57.8±1.0° 2θ.

As shown in FIG. 1, it was confirmed that the amorphous $Li_5AlO_4$ of Comparative Example 2 was amorphous by the fact that most of the characteristic peaks in crystalline $Li_5AlO_4$ disappeared.

As shown in FIG. 1, it was confirmed that the amorphous solid-state electrolyte $Li_{3.0}Al_{0.5}Cl_{0.5}O_{2.0}$ of Example 3 was amorphous by the fact that most of the characteristic peaks in crystalline $Li_5AlO_4$ disappeared.

Although not shown in the drawings, it was confirmed that the solid-state electrolytes of Examples 1 to 2 and 4 to 6 were also amorphous.

Referring to FIG. 1, in the XRD spectrum of the $Li_{3.0}Al_{0.5}Cl_{0.5}O_{2.0}$ solid-state electrolyte, a ratio (Ib/Ia) of an intensity (Ib) of the second peak at a diffraction angle of 35.0±1.0°2θ to an intensity (Ia) of the first peak at a diffraction angle of 47.0±1.0°2θ was 3 or less.

Referring to FIG. 1, in the XRD spectrum of the $Li_{3.0}Al_{0.5}Cl_{0.5}O_{2.0}$ solid-state electrolyte, a ratio (Ib/Ic) of the intensity (Ib) of the second peak at a diffraction angle of 35.0±1.0° 2θ to an intensity (Ic) of the third peak at a diffraction angle of 57.8±1.0° 2θ was 4 or less.

Referring to FIG. 1, in the XRD spectrum of $Li_{3.0}Al_{0.5}Cl_{0.5}O_{2.0}$ solid-state electrolyte, a first full width at half maximum (FWHM, F1) of the first peak at a diffraction angle of 47.0±1.0°2θ was 3.0000°2θ, and in the XRD spectrum of crystalline $Li_5AlO_4$ obtained under the same conditions, a second FWHM (F2) of the first peak at a diffraction angle of 47.0±1.0° 2θ was 0.2290° 2θ. A ratio (F1/F2) of the first FWHM (F1) to the second FWHM (F2) was 1.3 or greater.

Referring to FIG. 1, in the XRD spectrum of $Li_{3.0}Al_{0.5}Cl_{0.5}O_{2.0}$ solid-state electrolyte, a third full width at half maximum (FWHM, F3) of the second peak at a diffraction angle of 35.0±1.0° 2θ was 0.9000°2θ, and in the XRD spectrum of crystalline $Li_5AlO_4$ obtained under the same conditions, a fourth FWHM (F4) of the second peak at a diffraction angle of 35.0±1.0° 2θ was 0.1535°2θ. A ratio (F3/F4) of the third FWHM (F3) to the fourth FWHM (F4) was 1.3 or greater.

Evaluation Example 2: Interatomic Distance Calculation

In the amorphous $Li_{3.4}Al_{0.6}Cl_{0.4}O_{2.4}$ electrolyte and the amorphous $Li_5AlO_4$, distance distributions between lithium and oxygen atoms and distance distributions between lithium atoms, were determined.

Distance distribution calculation was performed using a quantum computation. The quantum computation was performed using Density Functional Theory (DFT).

The results of calculations of distance distributions between lithium and oxygen atoms and distance distributions between lithium atoms in the amorphous $Li_{3.4}Al_{0.6}Cl_{0.4}O_{2.4}$ electrolyte and the amorphous $Li_5AlO_4$ are shown in FIG. 2 and FIG. 3.

As shown in FIG. 2, the distance between lithium and oxygen atoms in the amorphous $Li_{3.4}Al_{0.6}Cl_{0.4}O_{2.4}$ electrolyte showed an overall increase compared to the distance between lithium and oxygen atoms in the amorphous $Li_5AlO_4$. Therefore, it was confirmed that the lithium mobility of the amorphous $Li_{3.4}Al_{0.6}Cl_{0.4}O_{2.4}$ electrolyte was increased by $Cl^-$ units, compared to that in the amorphous $Li_5AlO_4$. For example, as shown in FIG. 2, a first distance between lithium and oxygen atoms in the amorphous $Li_{3.4}Al_{0.6}Cl_{0.4}O_{2.4}$ electrolyte was greater than a second distance between lithium and oxygen atoms in the amorphous $Li_5AlO_4$. The first distance corresponds to a distance between lithium and oxygen atoms corresponding to the position of the peak having a second highest proportion of the lithium and oxygen atoms on a Li—O distance distribution curve of the amorphous $Li_{3.4}Al_{0.6}Cl_{0.4}O_{2.4}$ solid-state electrolyte. The second distance corresponds to a distance between the lithium atom and the oxygen atom corresponding to the position of the peak having a second highest proportion of the lithium and oxygen atoms on a Li—O distance distribution curve of the amorphous $Li_5AlO_4$. Referring to FIG. 2, the first distance was greater than 2.1 Å and the second distance was less than 2.1 Å.

As shown in FIG. 3, a proportion of the lithium atoms on a Li—Li distance distribution curve having a distance of around 3 Å in the amorphous electrolyte $Li_{3.4}Al_{0.6}Cl_{0.4}O_{2.4}$, was increased compared to the proportion of the lithium atoms on a Li—Li distance distribution curve having a distance of around 3 Å in amorphous $Li_5AlO_4$. Therefore, it was confirmed that lithium diffusion sites of the amorphous electrolyte $Li_{3.4}Al_{0.6}Cl_{0.4}O_{2.4}$ increased by $Cl^-$ units, compared to that in the amorphous $Li_5AlO_4$. For example, as shown in FIG. 3, the proportion of lithium atoms having a third distance between the lithium atoms in the amorphous $Li_{3.4}Al_{0.6}Cl_{0.4}O_{2.4}$ electrolyte, was greater than the proportion of lithium atoms having a fourth distance between the lithium atoms in the amorphous $Li_5AlO_4$. The proportion of the lithium atoms having the third distance corresponds to a proportion of the lithium atoms having the distance of about 2.5 Å to about 3.5 Å on a Li—Li distance distribution curve of the amorphous $Li_{3.4}Al_{0.6}Cl_{0.4}O_{2.4}$ electrolyte, and the proportion of lithium atoms having the fourth distance corresponds to a proportion of the lithium atoms having the distance of about 2.5 Å to about 3.5 Å on a Li—Li distance distribution curve of the amorphous $Li_5AlO_4$.

Evaluation Example 3: Measurement of Ionic Conductivity and Lithium Diffusion Barrier After pulverizing the electrolyte powders prepared in Examples 1 to 8, Comparative Examples 1 to 5, and Reference Example 1, pellets were prepared by pressing the pulverized powders with uniaxial pressure. Shielding electrodes were deposited on both sides of the prepared pellets by sputtering gold (Au) electrodes. Impedance was measured using a 2-probe method using an impedance analyzer (Solartron 1400A/1455A impedance analyzer) for samples having the shielding electrodes formed on both sides thereof. The frequency range was 0.1 Hertz (Hz) to 1 megaHertz (MHz), and the amplitude voltage was 50 millivolts (mV). Measurement was made in an ambient atmosphere at 25° C. Resistance values were obtained from the arc of the Nyquist plot for the impedance measurement results, and after correcting electrode surface area and pellet thickness therefrom, ionic conductivity was calculated and the result thereof is shown in Table 1 below.

Figure 4:
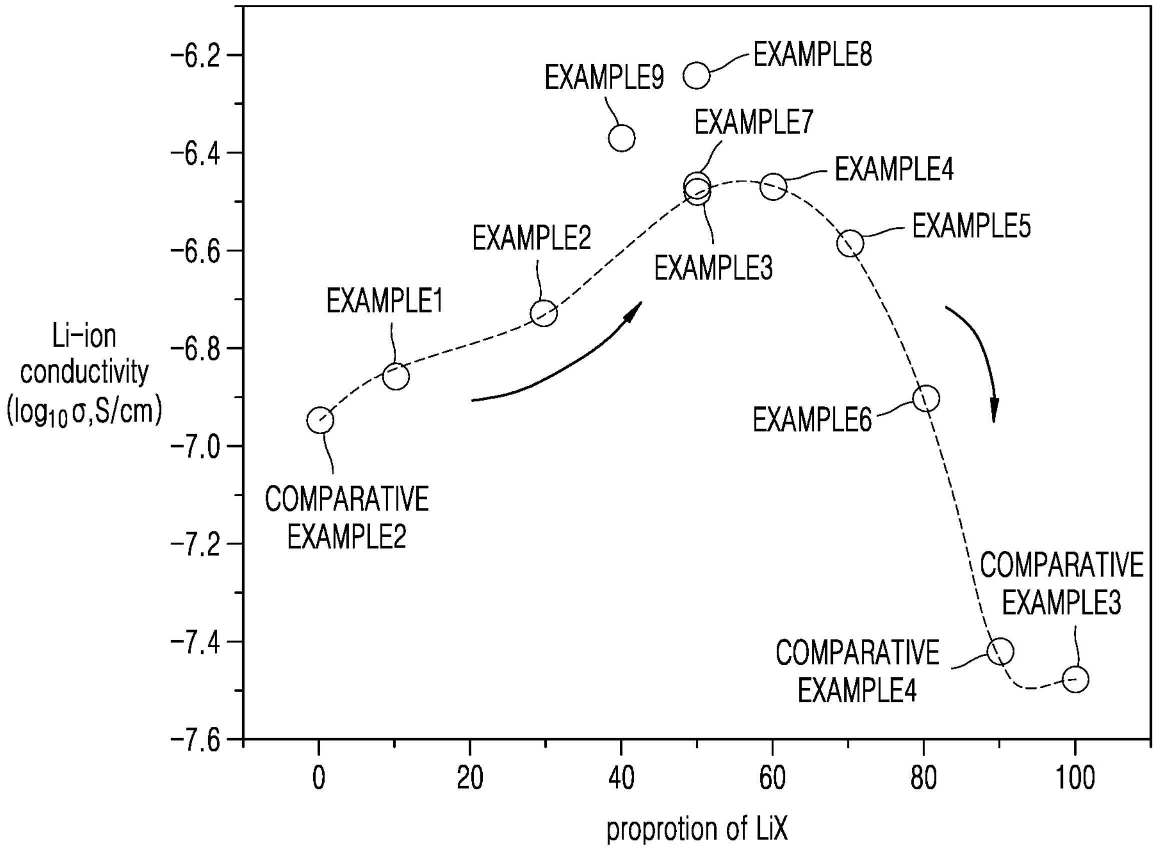
FIG. 4 is a graph of Li-ion conductivity ($\log_{10}\sigma$, Siemens per centimeter, S/cm) vs. proportion of $Li_2SO_4$ showing the results of ionic conductivity measurements of solid-state electrolytes in Examples 1 to 9, an amorphous $Li_5AlO_4$ electrolyte in Comparative Example 2, a crystalline LiCl in Comparative Example 3, and a solid-state electrolyte in Comparative Example 4.

In addition, by varying the temperature of the chamber accommodating a pellet, ionic conductivity as a function of temperature was measured. By transforming the Arrhenius plot illustrating changes in ionic conductivity as a function of temperature, lithium diffusion barrier corresponding to an activation energy (Ea) according to Arrhenius equation represented by Equation 1 below was calculated from the slope. The results thereof are shown in FIG. 4 and Table 2.

$$\sigma = A\exp(-Ea/kT) \quad \text{Equation 1}$$

In Equation 1, σ represents conductivity, A represents frequency factor, Ea represents activation energy, k represents a Boltzmann constant, and T represents absolute temperature.

TABLE 2

| | Lithium diffusion barrier [meV] | Ionic conductivity [S/cm] |
|---|---|---|
| Example 1 | 535 | $1.4 \times 10^{-7}$ |
| Example 2 | 588 | $1.9 \times 10^{-7}$ |
| Example 3 | 547 | $3.3 \times 10^{-7}$ |
| Example 4 | 483 | $3.4 \times 10^{-7}$ |
| Example 5 | 530 | $2.6 \times 10^{-7}$ |
| Example 6 | 622 | $1.3 \times 10^{-7}$ |
| Example 7 | — | $3.4 \times 10^{-7}$ |
| Example 8 | — | $5.7 \times 10^{-7}$ |
| Example 9 | 541 | $4.1 \times 10^{-7}$ |
| Comparative Example 1 | 725 | $0.01 \times 10^{-7}$ |
| Comparative Example 2 | 629 | $1.1 \times 10^{-7}$ |
| Comparative Example 3 | — | $0.3 \times 10^{-7}$ |
| Comparative Example 4 | 592 | $0.4 \times 10^{-7}$ |
| Reference Example 1 | 550 | $2.96 \times 10^{-7}$ |

As shown in FIG. 4 and Table 2, the amorphous solid-state electrolytes of Examples 1 to 9 exhibited improved ionic conductivity compared to the solid-state electrolytes in Comparative Examples 1 to 4 and the solid-state electrolyte in Reference Example 1.

The amorphous solid-state electrolytes of Examples 1 to 9 exhibited improved ionic conductivity compared to each of the crystalline $Li_5AlO_4$ of Comparative Example 1, the amorphous $Li_5AlO_4$ of Comparative Example 2, and the crystalline LiCl of Comparative Example 3.

According to an aspect of the disclosure, a novel solid-state electrolyte having a wide voltage window of 3.0 V or greater as compared to lithium metal and improved ionic conductivity may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid-state electrolyte comprising:

a compound represented by Formula 1

$$Li_{5-4y}Al_{1-y}X_yO_{4-4y-\delta} \quad \text{Formula 1}$$

wherein in Formula 1, $0.1 \le y \le 0.8$ and $0 \le \delta < 1$, and X is Cl, Br, or a combination thereof, and wherein the compound is amorphous.

2. The solid-state electrolyte of claim 1, wherein the solid-state electrolyte has a first peak at a diffraction angle of 47.0±1.0° 2θ and a second peak at a diffraction angle of 35.0±1.0° 2θ, when analyzed by an X-ray diffraction using CuKα radiation, and wherein a ratio of an intensity of the second peak to an intensity of the first peak is about 3 or less.

3. The solid-state electrolyte of claim 1, wherein the solid-state electrolyte has a second peak at a diffraction angle of 35.0±1.0° 2θ and a third peak at a diffraction angle of 57.8±1.0° 2θ, when analyzed by an X-ray diffraction using CuKα radiation, and wherein a ratio of an intensity of the second peak to an intensity of the third peak is about 4 or less.

4. The solid-state electrolyte of claim 1, wherein a first full width at half maximum of a first peak of the solid-state electrolyte at a diffraction angle of 47.0±1.0° 2θ in an X-ray diffraction spectrum of the solid-state electrolyte is greater than a second full width at half maximum of a first peak of a crystalline $Li_5AlO_4$ at a diffraction angle of 47.0±1.0° 2θ in an X-ray diffraction spectrum of the crystalline $Li_5AlO_4$, when measured under a same condition as the solid-state electrolyte and using CuKα radiation, and a ratio of the first full width at half maximum to the second full width at half maximum is about 1.3 or greater.

5. The solid-state electrolyte of claim 1, wherein a third full width at half maximum of a second peak of the solid-state electrolyte at a diffraction angle of 35.0±1.0° 2θ in an X-ray diffraction spectrum of the solid-state electrolyte is greater than a fourth full width at half maximum of a second peak of a crystalline $Li_5AlO_4$ at a diffraction angle of 35.0±1.0° 2θ in an X-ray diffraction spectrum of the crystalline $Li_5AlO_4$, when measured under a same condition as the solid-state electrolyte and using CuKα radiation, and a ratio of the third full width at half maximum to the fourth full width at half maximum is about 1.3 or greater.

6. The solid-state electrolyte of claim 1, wherein a first distance between a lithium atom and an oxygen atom in the compound represented by Formula 1 is greater than a second distance between a lithium atom and an oxygen atom in an amorphous $Li_5AlO_4$, wherein the first distance is a distance between lithium and oxygen atoms, corresponding to a peak having a second highest proportion of the lithium and oxygen atoms in a distance distribution curve of the lithium and oxygen atoms in the compound represented by Formula 1, and wherein the second distance is a distance between lithium and oxygen atoms, corresponding to a peak having a second highest proportion of the lithium and oxygen atoms in a distance distribution curve of the lithium and oxygen atoms in the amorphous $Li_5AlO_4$.

7. The solid-state electrolyte of claim 6, wherein the first distance is greater than about 2.1 angstroms and the second distance is less than about 2.1 angstroms.

8. The solid-state electrolyte of claim 1, wherein in the compound represented by Formula 1, a proportion of lithium atoms having a third distance between the lithium atoms in the compound represented by Formula 1 is greater than a proportion of lithium atoms having a fourth distance between the lithium atoms in an amorphous $Li_5AlO_4$, wherein the proportion of the lithium atoms having the third distance is a proportion of the lithium atoms having a distance of about 2.5 angstroms to about 3.5 angstroms in a distance distribution curve of the lithium atoms in the compound represented by Formula 1, and the proportion of the lithium atoms having the fourth distance is a proportion of the lithium atoms having a distance of about 2.5 angstroms to about 3.5 angstroms in a distance distribution curve of the lithium atoms in the amorphous $Li_5AlO_4$.

9. The solid-state electrolyte of claim 1, wherein the compound represented by Formula 1 comprises an $AlO_4^{5-}$ unit and an $X^-$ unit, and the $X^-$ unit is disposed adjacent to the Li in the compound represented by Formula 1.

10. The solid-state electrolyte of claim 9, wherein a proportion of the $AlO_4^{5-}$ unit is about 20 percent to about 90 percent, relative to a total content of the $AlO_4^{5-}$ unit and the $X^-$ unit in the compound represented by Formula 1, and a proportion of the $X^-$ unit is about 10 percent to about 80 percent, relative to the total content of the $AlO_4^{5-}$ unit and the $X^-$ unit in the compound represented by Formula 1.

11. The solid-state electrolyte of claim 9, wherein the compound represented by Formula 1 has an ionic conductivity at 25° C. of $1\times10^{-7}$ Siemens per centimeter or greater, and the Li in the compound represented by Formula 1 is randomly disposed within the compound.

12. The solid-state electrolyte of claim 1, wherein the solid-state electrolyte has an ionic conductivity at 25° C. of $1\times10^{-7}$ Siemens per centimeter or greater, and the solid-state electrolyte has a lithium diffusion barrier of 625 millielectronvolts or less.

13. The solid-state electrolyte of claim 1, wherein the solid-state electrolyte is free of LiI or iodine, and is electrochemically stable at a voltage of 3.0 volts or greater as compared to lithium metal.

14. The solid-state electrolyte of claim 1, wherein in the compound represented by Formula 1, an ionic radius of X is greater than an ionic radius of oxygen.

15. A lithium battery comprising:

a cathode;

an anode; and an electrolyte disposed between the cathode and the anode, wherein the cathode, the anode, the electrolyte, or a combination thereof, comprises the solid-state electrolyte according to claim 1.

16. The lithium battery of claim 15, wherein the lithium battery is a lithium ion battery, a solid-state battery, or a multilayer ceramic battery.

17. A method of preparing the solid-state electrolyte of claim 1, the method comprising:

providing a first material comprising a crystalline $Li_5AlO_4$ and a lithium compound comprising a crystalline LiX; and mechanochemically contacting the first material and the lithium compound to prepare the amorphous compound represented by Formula 1, to prepare the solid-state electrolyte comprising the compound represented by Formula 1.

18. The method of claim 17, wherein the first material and the lithium compound are mixed in a molar ratio of about 9:1 to about 2:8.

19. The method of claim 17, wherein the mechanochemically contacting comprises mechanical milling to initiate a mechanochemical reaction, and the mechanical milling is carried out by a dry method in an inert atmosphere for about 10 hours to about 1,000 hours, and the mechanochemical reaction is an exothermic reaction, and a temperature of the exothermic reaction is about 100° C. to about 500° C.

20. The method of claim 17, wherein the preparing of the solid-state electrolyte is carried out without additional heating.

* * * * *